United States Patent
Chou et al.

(10) Patent No.: US 8,971,912 B2
(45) Date of Patent: Mar. 3, 2015

(54) PAGING PROCESS IN A HOME CELLULAR NETWORK

(75) Inventors: Chie-Ming Chou, Qingshui Town (TW); Jung-Mao Lin, Dali (TW)

(73) Assignee: Industrial Technology Research Institute, Hsinchu (TW)

( * ) Notice: Subject to any disclaimer, the term of this patent is extended or adjusted under 35 U.S.C. 154(b) by 561 days.

(21) Appl. No.: 12/494,818

(22) Filed: Jun. 30, 2009

(65) Prior Publication Data

US 2010/0159960 A1 Jun. 24, 2010

Related U.S. Application Data

(60) Provisional application No. 61/140,745, filed on Dec. 24, 2008.

(51) Int. Cl.
| | |
|---|---|
| *H04W 68/00* | (2009.01) |
| *H04W 68/04* | (2009.01) |
| *H04W 68/08* | (2009.01) |
| *H04W 84/04* | (2009.01) |
| *H04W 52/02* | (2009.01) |

(52) U.S. Cl.
CPC ............ *H04W 68/04* (2013.01); *H04W 68/08* (2013.01); *H04W 84/045* (2013.01); *H04W 52/0216* (2013.01)
USPC ....................................................... 455/456

(58) Field of Classification Search
None
See application file for complete search history.

(56) References Cited

U.S. PATENT DOCUMENTS

| | | | |
|---|---|---|---|
| 5,826,173 A * | 10/1998 | Dent ............................ | 340/7.38 |
| 7,076,258 B2 | 7/2006 | Motegi et al. | |
| 7,200,412 B2 | 4/2007 | Kim | |
| 2003/0202489 A1 * | 10/2003 | Lee ............................... | 370/331 |
| 2006/0014550 A1 * | 1/2006 | Ryu et al. ...................... | 455/458 |
| 2007/0082683 A1 * | 4/2007 | Na et al. ..................... | 455/456.1 |
| 2007/0105600 A1 | 5/2007 | Mohanty et al. | |
| 2011/0201354 A1 * | 8/2011 | Park et al. .................. | 455/456.1 |
| 2011/0256883 A1 * | 10/2011 | Park et al. .................. | 455/456.1 |

FOREIGN PATENT DOCUMENTS

WO        WO 01 97549        12/2001

OTHER PUBLICATIONS

Yanover, Vladimir, et al., "Improvement in MBS in 802.16REV2", IEEE 802.16 Broadband Wireless Access Working Group, IEEE C802.16maint-08/171r8, May 15, 2008.
European Search Report dated Apr. 14, 2010 for corresponding European Patent Application No. 09251779.6 (7 pages).

* cited by examiner

*Primary Examiner* — Dwayne Bost
*Assistant Examiner* — Christopher Kohlman
(74) *Attorney, Agent, or Firm* — Finnegan, Henderson, Farabow, Garrett & Dunner LLP

(57) ABSTRACT

Disclosed embodiments include a method of paging one of a plurality of mobile subscribers in a wireless communication network. The method includes receiving, at a base station, an idle mode request from the one mobile subscriber and sending an idle mode notification to a control device, after receiving the idle mode request from the one mobile subscriber. The method also includes receiving a paging request from the control device and sending a paging advertisement intended for the one mobile subscriber, after receiving the paging request from the control device.

19 Claims, 12 Drawing Sheets

PAGING PROCESS IN A HOME CELLULAR NETWORK

RELATED APPLICATION

This application claims priority from Provisional Application No. 61/140,745, filed Dec. 24, 2008, the entire contents of which are hereby incorporated by reference.

FIELD OF THE INVENTION

This application relates to systems and methods of paging a mobile subscriber in a wireless communication network.

BACKGROUND

Wireless communication networks enable voice and data services for various mobile electronic devices, such as cellular phones, personal digital assistants, and laptop computers. The increased use of these and many other, electronic devices has resulted in an increased demand for high-speed and reliable wireless communication networks.

FIG. 1 is a diagram illustrating an exemplary wireless communication network 100 for providing wireless services to electronic devices. Network 100 may include a wireless service provider 102, a macro-cell base station (BS) 104, a macro-cell coverage area 106, and first mobile subscriber (MS) 108.

Wireless service provider 102 may provide wireless services, such as voice and data, to electronic devices. To deliver the wireless services, wireless service provider 102 may link to macro-cell BS 104. Macro-cell BS 104 may be a high-power wireless access point that wirelessly connects electronic devices to wireless service provider 102. Macro-cell BS 104 delivers wireless connectivity to electronic devices located within macro-cell coverage area 106. Macro-cell coverage area 106 is a geographic coverage area within a wireless range of macro-cell BS 104. In exemplary network 100, first MS 108 is assumed to be located within macro-cell coverage area 106. First MS 108 may be a mobile phone, a personal digital assistant, or a computer, for example. First MS 108 wirelessly links to macro-cell BS 104 in order to receive voice and data services from wireless service provider 102.

Strength of signals received by macro-cell BS 104 may vary throughout macro-cell coverage area 106. For example, if macro-cell BS 104 is deployed in a city with many buildings, the buildings may obstruct connectivity to macro-cell BS 104 in some areas of macro-cell coverage area 106. Accordingly, connectivity to macro-cell BS 104 may be weak in some areas of macro-cell coverage area 106.

Accordingly, wireless communication network 100 may further include a network 110, a broadband router 112, a femto-cell BS 114, and a femto-cell coverage area 116. A second MS 118 is assumed to be located within femto-cell coverage area 116. Wireless service provider 102 is linked to network 110. Network 110 may include any link or communications network, including the Internet. Network 110 is further linked to broadband router 112. Broadband router 112 provides external connectivity to network 110. Broadband router 112 may be any access point to network 110, such as a dial-up modem, cable modem, DSL modem, wireless modem or the like.

Broadband router 112 is linked to femto-cell BS 114. Femto-cell BS 114 may be a low power wireless access point that wirelessly connects electronic devices to wireless service provider 102, via broadband router 112 and network 110. There may be any number of femto-cell BS's 114 within macro-cell coverage area 106, each such femto-cell BS 114 being capable of delivering wireless connectivity to electronic devices located within femto-cell coverage area 116. Femto-cell coverage area 116 is a geographic coverage area within a wireless range of femto-cell BS 114, and is smaller than macro-cell coverage area 106. Femto-cell coverage area 116 serves to provide overlapping coverage for weak areas of macro-cell coverage area 106 by boosting coverage in weak areas of macro-cell coverage area 106.

Second MS 118 may be a mobile phone, a personal digital assistant, or a computer, for example. Second MS 118 wirelessly links to femto-cell BS 114 in order to receive voice and data services from wireless service provider 102. Therefore, even if second MS 118 is in a weak spot within macro-cell coverage area 106, it may still receive services from wireless service provider 102 by linking to femto-cell BS 114. In this way, femto-cell BS 114 strengthens coverage provided by macro-cell BS 104.

Because second MS 118 may be a mobile electronic device, it may have limited battery power. Accordingly, second MS 118 may enter an idle mode when it is not actively using services provided by wireless service provider 102. For example, second MS 118 may enter the idle mode when it is not connected to a voice call, or when it is not connected to the Internet. When second MS 118 goes into the idle mode, it ceases communicating with femto-cell 114. Moreover, second MS 118 may move to a different coverage area, other than femto-cell coverage area 116 while in the idle mode. Accordingly, it may be difficult for wireless service provider 102 to locate second MS 118 if it moves to a different coverage area while in the idle mode.

SUMMARY

In accordance with disclosed embodiments, there is provided a method of paging one of a plurality of mobile subscribers in a wireless communication network, the method comprising: receiving, at a base station, an idle mode request from the one mobile subscriber; sending an idle mode notification to a control device, after receiving the idle mode request from the one mobile subscriber; receiving a paging request from the control device; and sending a paging advertisement intended for the one mobile subscriber, after receiving the paging request from the control device.

In accordance with disclosed embodiments there is also provided a computer-readable medium comprising program instructions, which, when executed by a processor, cause the processor to perform a method of paging one of a plurality of mobile subscribers in a wireless communication network, the method comprising: receiving, at a base station, an idle mode request from the one mobile subscriber; sending an idle mode notification to a control device, after receiving the idle mode request from the one mobile subscriber; receiving a paging request from the control device; and sending a paging advertisement intended for the one mobile subscriber, after receiving the paging request from the control device.

In accordance with disclosed embodiments there is also provided a system for paging one of a plurality of mobile subscribers in a wireless communication network, the system comprising: a control device; and a base station configured to: receive an idle mode request from the one mobile subscriber; send an idle mode notification to the control device, after receiving the idle mode request from the one mobile subscriber; receive a paging request from the control device; and send a paging advertisement intended for the one mobile subscriber, after receiving the paging request from the control device.

In accordance with disclosed embodiments there is also provided a method of paging an idle mobile subscriber in a wireless communication network, the method comprising: receiving, at a first base station, an idle mode request from the mobile subscriber; sending an idle mode notification to a paging controller, after receiving the idle mode request from the mobile subscriber; receiving an idle mode command from a second base station; and sending the idle mode command to the mobile subscriber after receiving the idle mode command from the second base station.

Additional advantages of the application will be set forth in part in the description which follows, and in part will be obvious from the description, or may be learned by practice of the application. The advantages of the application will be realized and attained by means of the elements and combinations particularly pointed out in the appended claims.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain principles of the application.

DESCRIPTION OF THE EMBODIMENTS

Reference will now be made in detail to exemplary embodiments which are illustrated in the accompanying drawings. Wherever possible, the same reference numbers will be used throughout the drawings to refer to the same or like parts.

As discussed, a mobile subscriber may enter an idle mode when not busy in order to conserve battery power. A paging process is used to locate the mobile subscriber that is in the idle mode.

Figure 1:
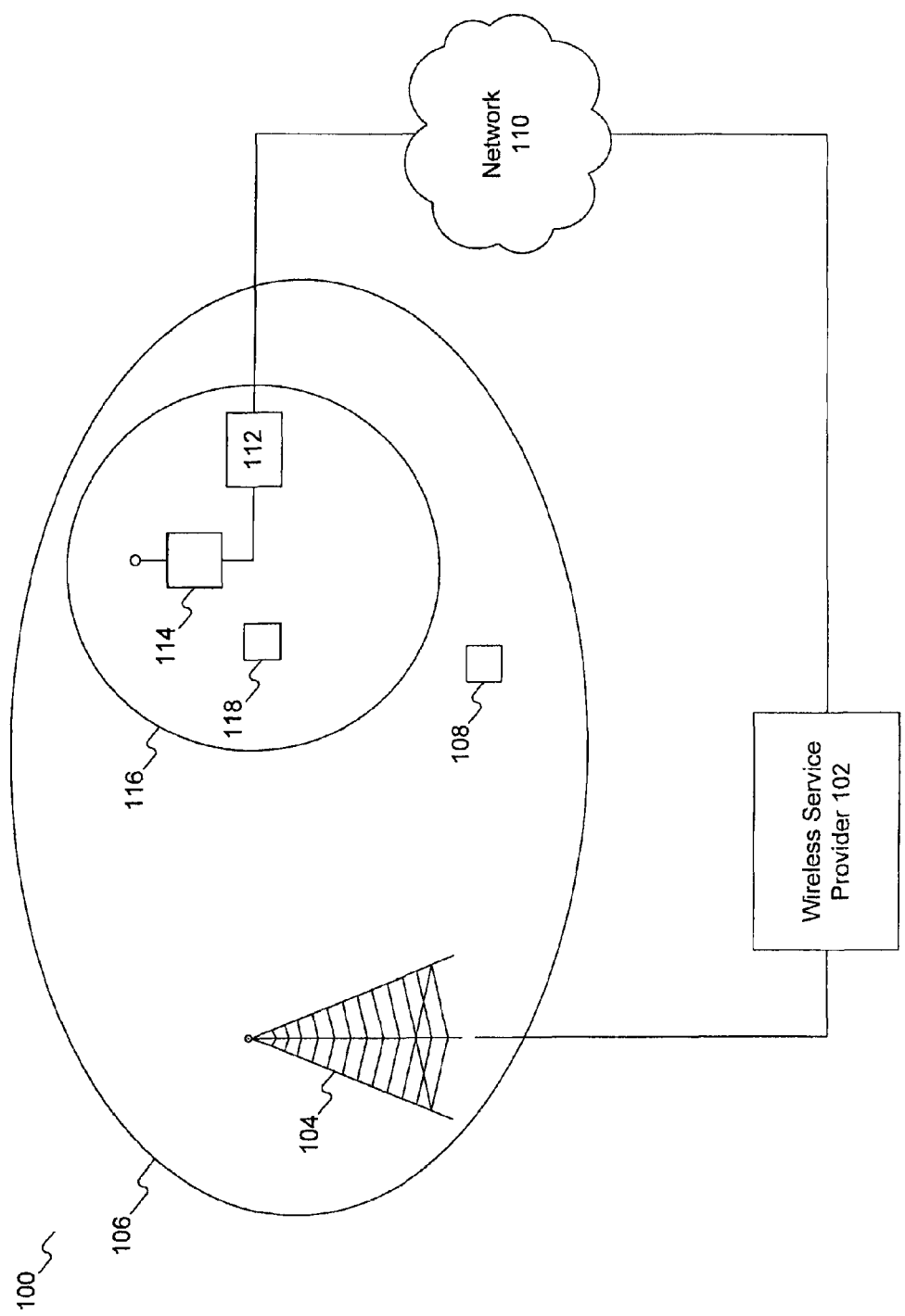
FIG. 1 is a diagram illustrating a wireless communication network used to provide wireless services to electronic devices.
Figure 2:
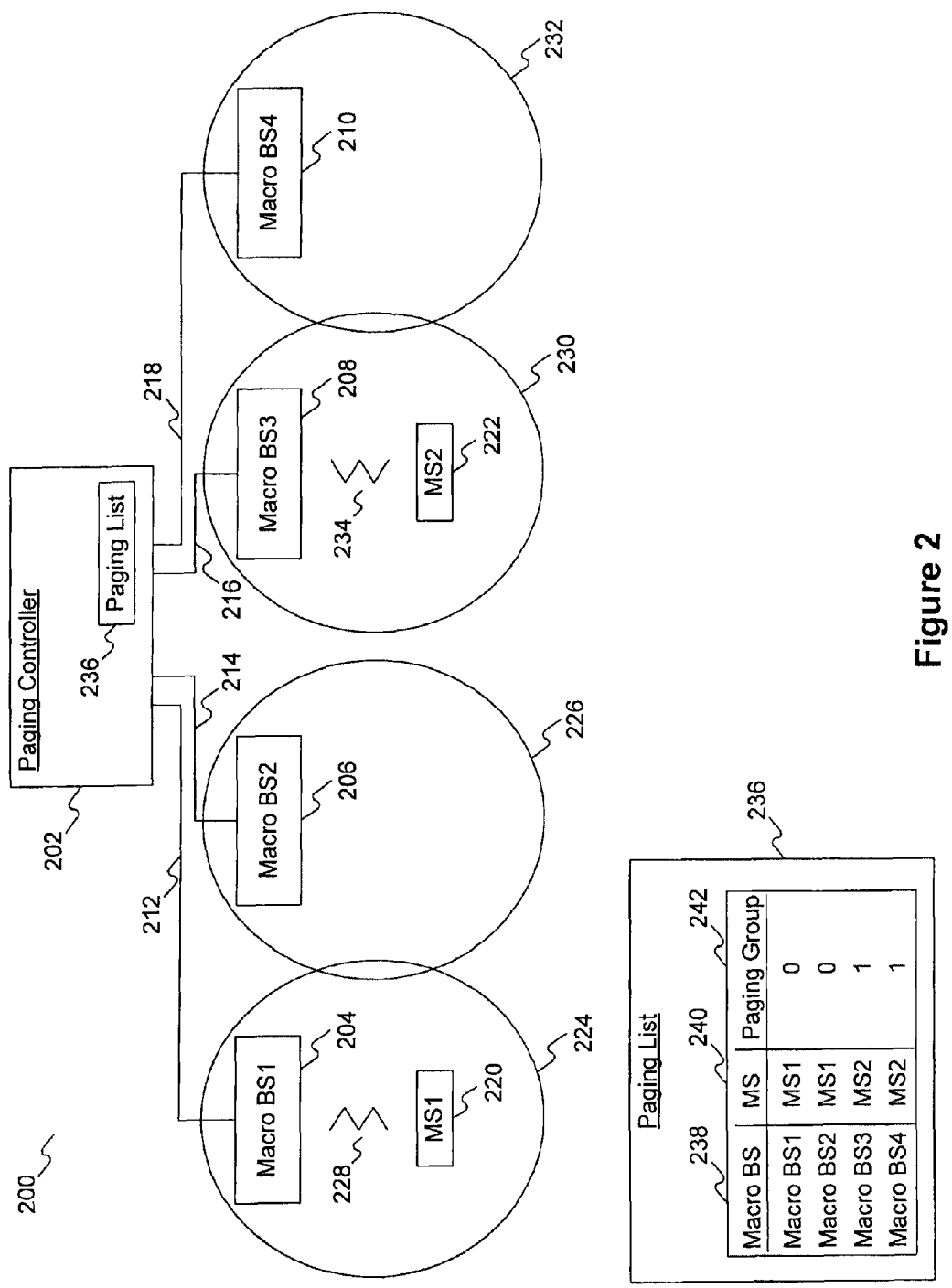
FIG. 2 is a diagram illustrating a wireless communication network used to provide a first paging process for a stationary mobile subscriber that is in an idle mode.

FIG. 2 is a diagram illustrating an exemplary wireless communication network 200 in which a first paging process is practiced for locating a stationary mobile subscriber that is in an idle mode. Wireless communication network 200 includes a paging controller 202, a macro BS1 204, a macro BS2 206, a macro BS3 208, and a macro BS4 210.

Paging controller 202 is associated with or a part of a wireless service provider 102. Paging controller 202 is coupled to communicate with macro BS1 204, macro BS2 206, macro BS3 208, and macro BS4 210 over one or more of links 212, 214, 216, or 218. Links 212, 214, 216, or 218 may be any physical or logical link to paging controller 202, including via a network such as the Internet. Paging controller 202 may direct any one or more of macro BS1 204, macro BS2 206, macro BS3 208, and macro BS4 210 to page a mobile subscriber that has gone into an idle mode.

An MS1 220 is assumed to be in a macro coverage area 224 of macro BS1 204, and outside of a macro coverage area 226 of macro BS2 206. MS1 220 may communicate with macro BS1 204 over a wireless link 228. MS2 222 is assumed to be in a macro coverage area 230 of macro BS3 208, and outside of a macro coverage area 232 of macro BS4 210. MS2 220 is assumed to communicate with macro BS3 208 over a wireless link 234. For explanatory purposes, MS1 220 and MS2 222 are assumed to be stationary mobile subscribers that are in an idle mode to conserve battery power.

Paging controller 202 includes a paging list 236 that is stored and maintained in a memory (not shown) of paging controller 202. Alternatively, paging list 236 may be stored in a remote memory. Paging list 236 includes a macro BS column 238, an MS column 240, and a paging group column 242. The use of paging list 236 is exemplary only, and is not intended to limit the scope of disclosed embodiments. Any configuration or data structure may be used to implement paging list 236. Moreover, additional information or less information may be included in paging list 236.

Macro BS column 238 lists macro BS1 204, macro BS2 206, macro BS3 208, and macro BS4 210 as items. MS column 240 lists MS1 220 and MS2 222 as items. Paging group column 242 lists paging group 0 and paging group 1 as items. Paging list 236 associates each item in BS column 238 with an item from MS column 240 and an item from paging group column 242.

Paging group column 242 indicates a paging group for each of macro BS1 204, macro BS2 206, macro BS3 208, and macro BS4 210. In this example, macro BS1 204 and macro BS2 206, as well as MS1 220, are part of paging group 0. Macro BS3 208 and macro BS4 210, as well as MS2 222, are part of paging group 1. When paging controller 202 seeks to locate a mobile subscriber that is idle, it sends a message to all macro base station(s) in the same paging group, in which the idle mobile subscriber was last located. Thus, paging controller 202 accesses paging list 236 when paging controller 202 seeks to locate a mobile subscriber.

For example, if paging controller 202 seeks to locate MS1 220, paging controller 202 accesses paging list 236. From paging list 236, paging controller 202 determines that MS1 220 is associated with both macro BS1 204 and macro BS2 206 of paging group 0. Paging controller 202 may then direct both macro BS1 204 and macro BS2 206 to page MS1 220 in order to determine its location.

As another example, if paging controller 202 seeks to locate MS2 222, paging controller 202 accesses paging list 236. From paging list 236, paging controller 202 determines that MS2 222 is associated with both macro BS3 208 and macro BS4 210 of paging group 1. Paging controller 202 may then direct both macro BS3 208 and macro BS4 210 to page MS2 222 in order to determine its location. In this way, paging controller 202 pages a mobile subscriber.

Figure 3:
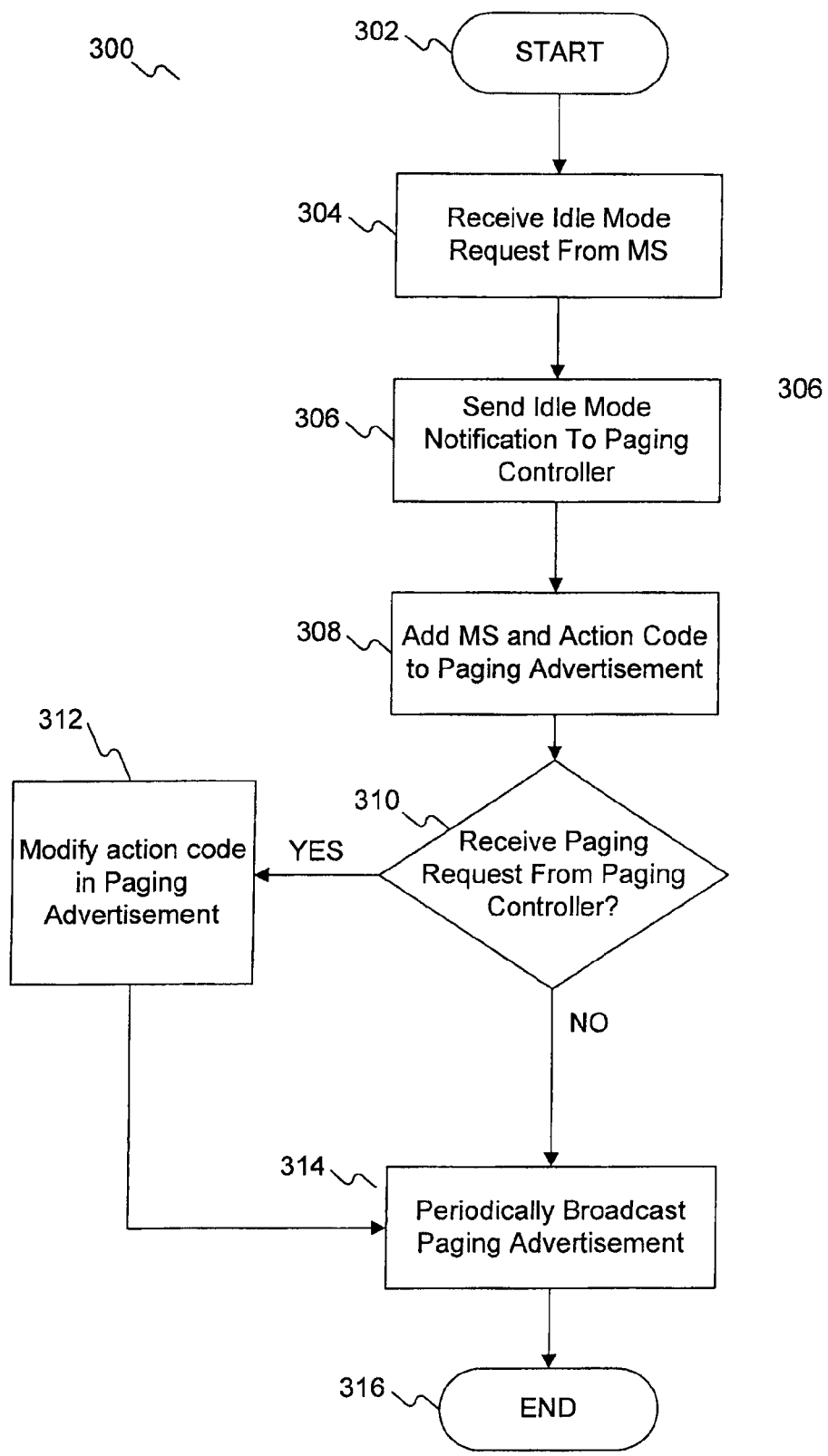
FIG. 3 is a flow diagram of the first paging process for paging a stationary mobile subscriber that is in idle mode.

FIG. 3 is a flow diagram of a first paging process 300 for a stationary mobile subscriber that is in idle mode, such as MS1 220 or MS2 222. Process 300 starts at block 302. At block 304, macro BS1 204 receives an idle mode request from MS1 220 over wireless link 228. The idle mode request indicates that MS1 220 seeks to enter an idle mode in order to conserve battery power. At block 306, macro BS1 204 sends an idle mode notification to paging controller 202. The idle mode notification informs paging controller 202 that MS1 220 seeks to enter into the idle mode.

At block 308, macro BS1 204 adds an identifier of MS1 220 and a corresponding action code into the paging advertisement. At block 310, macro BS1 204 determines whether or not it has received a paging request from paging controller 202 via link 212. The paging request may be a request from paging controller 202 to determine a location of MS1 220 or to request MS1 220 to exit the idle mode by performing network entry. In determining where to send the paging request, paging controller 202 accesses paging list 236. Paging list 236 associates MS1 220 with paging group 0, including macro BS1 204 and macro BS2 206 in this example. Thus, if paging controller 202 seeks to page MS1 220, it sends a paging request to both macro BS1 204 and macro BS2 206 after consulting paging list 236. If macro BS1 204 does not receive the paging request (310—No), then macro BS1 204 need not modify its paging advertisement and continues to periodically broadcast the paging advertisement at block 314.

If macro BS1 204 does receive the paging request from paging controller 202 (310—Yes), then process 300 moves to block 312. At block 312, macro BS1 204 accesses the action code of MS1 220 that was added to the paging advertisement at block 308. Moreover, macro BS1 204 further modifies the action code in the paging advertisement based on the paging request from paging controller 202. Next, at block 314, macro BS1 204 periodically broadcasts the paging advertisement, to its macro coverage area 224 via a wireless link 228. Macro BS1 204 periodically broadcasts the paging advertisement to all idle mobile subscribers within its macro coverage area 224, whether or not it receives a paging request from paging controller 202. Moreover, after receiving the paging request from paging controller 202, macro BS1 204 modifies the action code corresponding to MS1 220 in the paging advertisement that it periodically broadcasts. The action code indicates that paging controller 202 seeks to page MS1 220. Macro BS2 206, which also received a paging request from paging controller 202, also broadcasts a paging advertisement with the modified action code corresponding to MS1 220 in its macro coverage area 226. The paging advertisement includes the paging group associated with the paging group ID of the base station, in this example, paging group 0 of macro BS1 204. Because MS1 220 is located in macro coverage area 224, MS1 220 receives the broadcast sent by macro BS1 204 and checks its corresponding action code in the received paging advertisement to determine that paging controller 202 seeks to page it. The broadcast sent by macro BS2 206 is therefore redundant in this example.

The paging advertisements may include a list of several mobile stations that are idle, as well as a corresponding action code for each of the listed idle mobile stations. Different action codes direct the mobile station to perform different actions, upon receiving the periodic paging advertisement. For example, the possible action code value may be 0, 1, 2 or 3. The action code value 3 may be reserved for future use. The action code value 0 may direct the corresponding idle MS to take no action. The action code value 1 may direct the corresponding idle MS to perform a location update process. The action code value 2 may direct the corresponding idle MS to perform network entry.

In an exemplary scenario, the default value of each idle MS's action code is 0. If paging controller 202 wants idle MS1 220 to perform network entry, it will send the paging request to macro BS1 204 and macro BS2 206. When macro BS1 204 and macro BS2 206 receive the paging request, they will modify the action code corresponding to idle MS1 220 from 0 to 2 in the paging advertisement, and then broadcast the paging advertisement at the next periodic interval. When MS1 220 receives the paging advertisement, it will read its action code of 2, and determine that paging controller 202 directs it to perform network entry.

In this way, paging controller 202 may successfully page MS1 220 via macro BS1 204. Moreover, paging controller 202 may also page MS2 222 via macro BS3 208 in a similar way.

FIG. 3 is exemplary only. As such, blocks 302-312 may be executed in any order. Moreover, additional steps may be included and/or some steps may be omitted.

Figure 4:
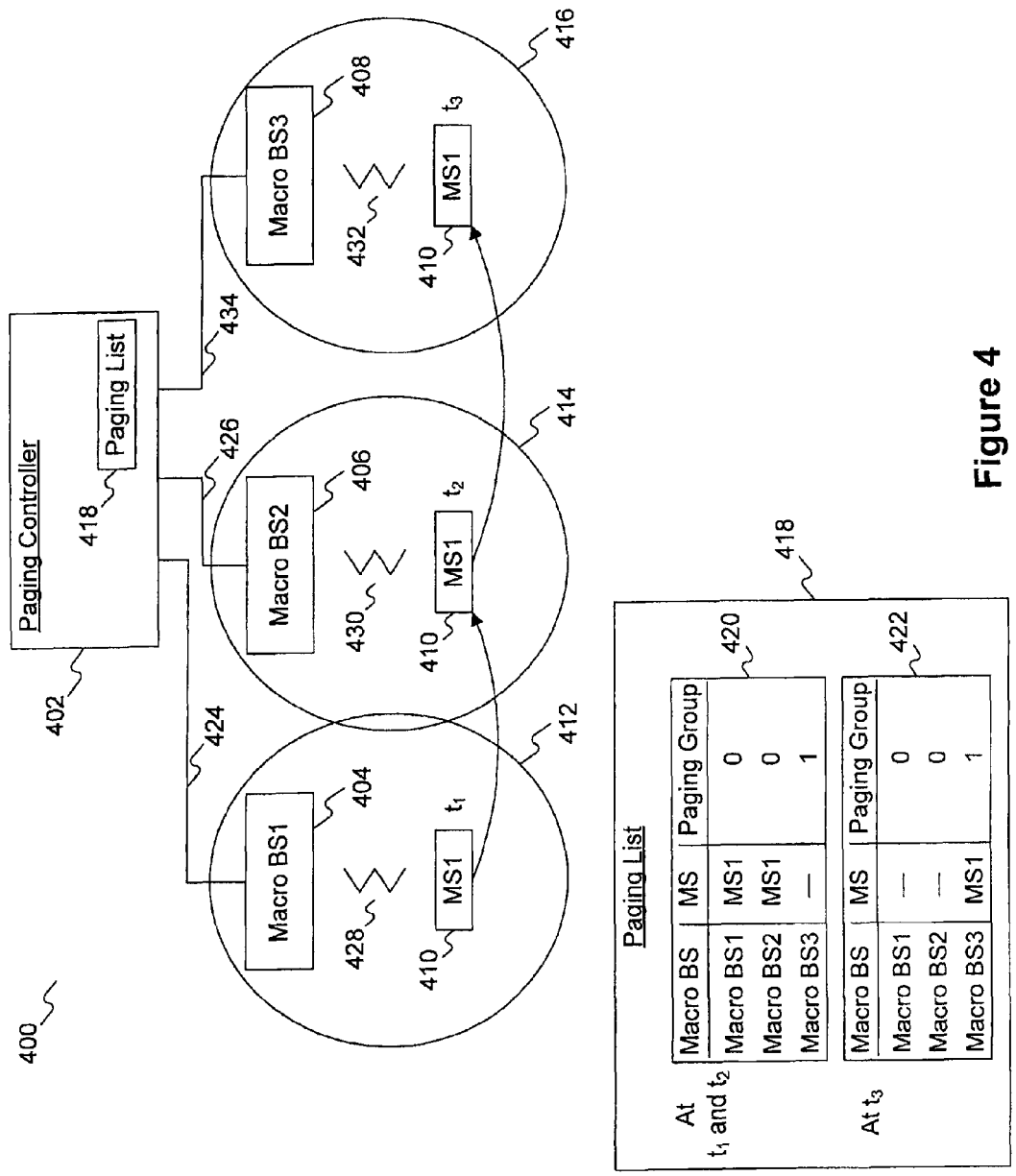
FIG. 4 is a diagram illustrating a wireless communication network used to provide the first paging process for an idle mobile subscriber which is moving.

FIG. 4 is a diagram illustrating an exemplary wireless communication network 400 in which the first paging process is practiced for locating an idle mobile subscriber which is moving. Wireless communication network 400 includes a paging controller 402, a macro BS1 404, a macro BS2 406, and a macro BS3 408, which may be similar to any of paging controller 202, a macro BS1 204, a macro BS2 206, and a macro BS3 208, of network 200. Paging controller 402 may communicate to macro BS1 404, macro BS2 206, and/or macro BS3 208 via links 424, 426, or 434. Moreover, links 424, 426, or 434 may be any physical or logical link to paging controller 402, including via a network such as the Internet.

An MS1 410 is assumed to be present in wireless communication network 400. MS1 410 is a mobile subscriber which, for exemplary purposes, is assumed to be in an idle mode to conserve battery power. MS1 410 is also assumed to be moving while it is in the idle mode. In particular, MS1 410 is located in a macro coverage area 412 of macro BS1 404 at a first time $t_1$. Next, MS1 410 moves to a macro coverage area 414 of macro BS 406, and is located there at a second time $t_2$. Finally, MS1 410 moves to macro coverage area 416 of macro BS 408, and is located there at a third time $t_3$.

Paging controller 402 accesses stored paging list 418 in order to page MS1 410. Paging list 418 is similar to paging list 236 of network 200. For illustrative purposes, paging list 418 includes a paging list 420 that exists at times $t_1$ and $t_2$, and a different paging list 422 that exists at time $t_3$. Paging list 418 may store paging lists 420 and 422 simultaneously. Alternatively, paging list 418 may store paging list 420 at times $t_1$ and $t_2$, and may overwrite paging list 420 with paging list 422 at time $t_3$. The use of paging lists 418, 420, and 422 is exemplary only and other configurations or data structures may be used.

For exemplary purposes, paging controller 402 is assumed to seek to page MS1 410 at each of times $t_1$, $t_2$, and $t_3$, for example in an attempt to connect incoming telephone calls to MS1 410. At first time $t_1$, paging controller 402 accesses paging list 420 to determine that MS1 410 is located in paging group 0, which is associated with macro BS1 404 and macro BS2 406. Thus, paging controller 402 sends a paging request to macro BS1 404 and macro BS2 406, over links 424 and 426, respectively. Macro BS1 404 periodically broadcasts paging advertisements to all idle mode subscribers within its macro coverage are 412. The paging advertisements include the paging group supported by macro BS1 404. Moreover, after receiving the paging request, macro BS1 404 modifies the action code corresponding to MS1 410 in the paging advertisement and broadcasts its periodic paging advertisement, via a link 428, to its macro coverage area 412. The modified action code in the paging advertisement indicates that paging controller 402 seeks to page MS1 410. Macro BS2 406, which also received a paging request from paging controller 402, also broadcasts a paging advertisement with the modified action code corresponding to MS1 410 in its paging advertisement over a link 430 to its macro coverage area 414. Because MS1 410 is located in macro coverage area 412, MS1 410 receives the broadcast sent by macro BS1 404 and checks the action code corresponding to it in the received paging advertisement to determine that paging controller 402 seeks to page it. The broadcast sent by macro BS2 406 is therefore redundant in this example. In this way, paging controller 402 successfully pages MS1 410 at first time $t_1$.

MS1 410 may move into macro coverage area 414, while in the idle mode, and be located there at second time $t_2$. When MS1 410 moves into macro coverage area 414, MS1 410 synchronizes with macro BS2 406 over link 430. In particular, MS1 410 only needs to perform downlink synchronization, which enables MS1 410 to listen to macro BS2 406. A broadcast message includes the paging group that is associated with macro BS2 406 and paging information that is associated with the paging advertisement message periodically broadcasted by BS2 406. MS1 410 reads the paging group in the broadcast message sent from macro BS2 406, and compares it to the paging group that it previously stored, which was associated with macro BS1 404. In this example, because the paging group of macro BS1 404 is the same as the paging group of macro BS2 406 (i.e., paging group 0), MS1 410 does not need to perform a location update process to update its paging information.

Furthermore, the paging information includes data that MS1 410 needs in order to receive the paging advertisement message. For example, the paging information may include communication protocol(s) and a time interval between the paging advertisement messages. Moreover, because the location update process is not performed, paging list 418 is not updated at second time $t_2$.

For example, if paging controller 402 needs to page MS1 410, then paging controller 402 accesses paging list 420 to determine that MS1 410 is located in paging group 0, which is associated with macro BS1 404 and macro BS2 406. In such case, upon determining that MS1 410 is located in paging group 0, paging controller 402 again sends a paging request to macro BS1 404 and macro BS2 406, over links 424 and 426, respectively. Macro BS1 404 and macro BS2 406 then each modify the action code corresponding to MS1 410 in their paging advertisements and broadcast the periodic paging advertisements via links 428 and 430, to their respective macro coverage areas 412 and 414. The action code indicates that paging controller 402 seeks to page MS1 410. Because MS1 410 is located in macro coverage area 414 and now synchronized with macro BS2 406, MS1 410 receives the broadcast sent by macro BS2 406, and checks its corresponding action code in the received paging advertisement to determine that paging controller 402 seeks to page it. The broadcast sent by macro BS1 404 is therefore redundant in this example. In this way, paging controller 402 successfully pages MS1 410 at second time $t_2$.

MS1 410 may move into macro coverage area 416, while in the idle mode, and be located there at a third time $t_3$. When MS1 410 moves into macro coverage area 416, MS1 410 synchronizes with macro BS3 408 over a link 432. The synchronization enables MS1 410 to listen to broadcast messages from macro BS3 408 instead of from macro BS2 406. The synchronization with macro BS3 408 may be a downlink synchronization similar to the previous downlink synchronization with macro BS2 406. After synchronization, MS1 410 is enabled to listen to broadcast messages from BS3 408. A broadcast message includes the paging group that is associated with macro BS3 408 and paging information that is associated with the paging advertisement message. MS1 410 reads the paging group in the broadcast message broadcasted by macro BS3 408, and compares it to the paging group that it previously stored, which was associated with macro BS2 406. In this example, because the paging group of macro BS2 406 (i.e., paging group 0) is different from the paging group of macro BS3 408 (i.e., paging group 1), MS1 410 needs to perform a location update process to update its paging information in the paging controller 402. Updating paging information requires additional battery power consumption on the part of MS1 410 because MS1 410 further needs to perform an uplink synchronization with BS3 408 to communicate with BS3 408, in addition to the downlink synchronization previously performed. Thus, it is preferable to avoid performing the location update process if possible.

Furthermore, paging list 418 is also updated when MS1 410 performs the location update process. In particular, MS1 410 sends a location update request to BS3 416, which in turn informs paging controller 402 that MS1 410 has moved into macro coverage area 416 of macro BS3 408. Next, paging controller 402 updates paging list 418 to associate MS1 410 with paging group 1, which includes BS3 416 (as in paging list 422). Moreover, macro BS3 408 adds MS1 410 and a corresponding action code, to the paging advertisement.

When paging controller 402 seeks to locate MS1 410 at third time $t_3$, paging controller 402 accesses paging list 422 to determine that MS1 410 is located in paging group 1, which is associated with macro BS3 408. As a result, paging controller 402 sends a paging request to macro BS3 408, over link 434. In response, macro BS3 408 updates the action code to indicate that paging controller 402 seeks to page MS1 410. MS1 410 receives the broadcast sent by macro BS3 408, and checks its action code in the received paging advertisement to determine that paging controller 402 seeks to page it. In this way, paging controller 402 successfully pages MS1 410 at third time $t_3$.

As discussed, performing the location update process in MS1 410 consumes additional battery power. In mobile devices such as MS1 410, conserving battery power may be an important design consideration. One way to avoid performing the location update process in a mobile subscriber, and thereby conserving battery power, is by assigning a greater number of base stations to the same paging group. The existence of a large number of base stations that belong to a single paging group reduces the number of times that a mobile subscriber needs to perform the location update process as it moves among macro coverage areas. In other words, as a mobile subscriber moves among macro coverage areas, it does not need to update its paging information as often, and thereby conserves battery power. For example, if macro BS3 408 belongs to paging group 0, as do macro BS1 404 and macro BS2 406, then MS1 410 would not need to update its paging information when it moves to macro coverage area 416.

However, a greater number of base stations within a single paging group may cause significant increases in communications overhead. This is because a paging controller sends a paging request to every base station in a paging group associated with the mobile subscriber. For example, paging controller 402 sends a paging request to both macro BS1 404 and macro BS2 406 when seeking MS1 410 at each of first time $t_1$ and second time $t_2$. In some situations, there may be thousands of base stations spread across a geographic area, with hundreds belonging to the same paging group. Sending paging requests to large numbers of base stations to locate a mobile subscriber that is in the range of a single base station produces significant communications overhead.

Moreover, all base stations within a single paging group broadcast the same paging advertisement over their broadcast channel(s) that is accessible to all synchronized idle mobile stations that are located in macro coverage areas associated with the paging group. If there are a large number of base stations within a single paging group, there may be a large number of corresponding idle mobile stations in the paging group. Because the paging advertisement lists the idle mobile stations and corresponding information, having a large number of idle mobile stations in a paging group leads to a large paging advertisement. This increase in the size of the paging advertisements sent to the mobile stations may be an additional source of overhead for each base station in the paging group.

This may be significant with the introduction of femto-cells, within macro-cells, to improve coverage. In other words, assigning macro-cells and femto-cells to the same paging group may lead to significant communications overhead. For example, as discussed, those base stations that are in the same paging group periodically broadcast the same paging advertisement over their broadcast channel, which is accessible to all mobile stations within the paging group. The paging advertisement lists the idle mobile stations, and contains the information of all the idle mobile stations in the same paging group. Thus, the added femto-cells would need to broadcast large paging advertisements as well, leading to communications overhead in the femto-cells.

Moreover, a closed subscriber group (CSG) femto-cell is one in which the mobile stations that can access the CSG femto-cell are restricted. Restricted ones of the mobile stations are able to contact the CSG femto-cell base station. Thus, if a femto-cell base station and overlapped macro cell base station share the same paging group, the paging advertisement sent by each contains all idle MSs in the paging group, and may cause unnecessary overhead for the CSG femto-cell base station. As discussed, this is because not all idle MSs recorded in the paging advertisement can access the CSG femto-cell base station. However, the CSG femto-cell base station still sends periodic paging advertisements, which list those idle mobile stations that can not access the CSG femto-cell. By contrast, if the femto-cell base station uses a different paging group ID than the overlapped macro cell base station, the mobile station would need to perform a location update process when it moves in or out of a femto-cell coverage area.

Thus, it may be beneficial to increase the number of base stations (associated with macro-cells and femto-cells) that belong to a single paging group, while reducing the communications overhead caused by the large paging advertisement used for paging all of the idle mobile stations that belong to the paging group.

Figure 5:
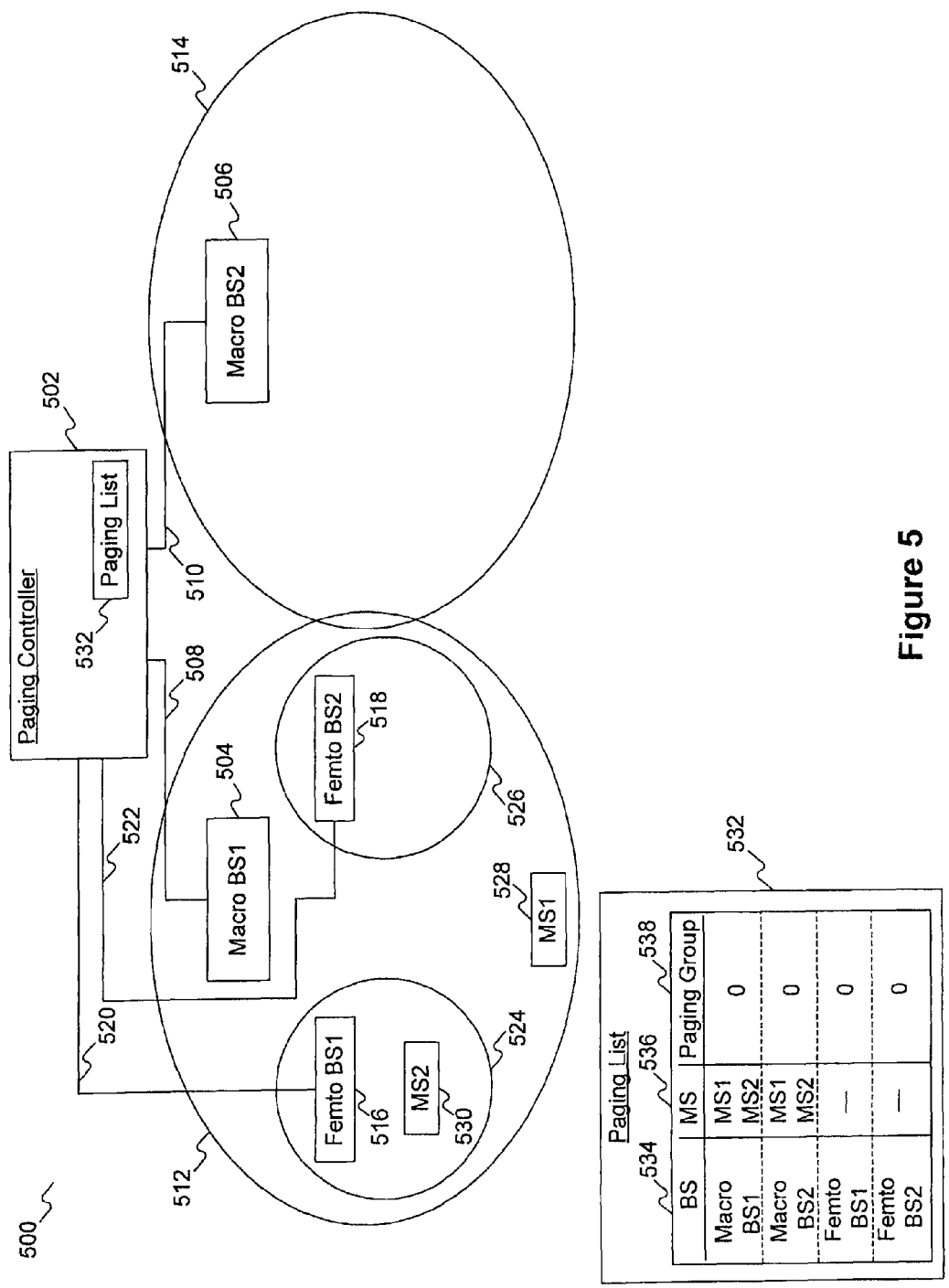
FIG. 5 is a diagram illustrating a wireless communication network used to provide a second paging process for a mobile subscriber.

FIG. 5 is a diagram illustrating an exemplary wireless communication network 500, including femto-cells, in which a second paging process is practiced for a mobile subscriber. Network 500 includes a paging controller 502, a macro-cell BS1 504, and a macro-cell BS2 506. Paging controller 502 communicates with macro-cell BS1 504 via a link 508, and communicates with macro-cell BS2 506 via a link 510. Links 508 or 510 may be any physical or logical link to paging controller 502, including via a network such as the Internet.

Macro-cell BS1 504 provides a wireless service over a macro coverage area 512. Similarly, macro-cell BS2 506 provides a wireless service over a macro coverage area 514. Macro coverage areas 512 and/or 514 may include weak spots, i.e., locations of weak connectivity, due to deployment in environments that may limit the range of macro-cell BS1 504 and/or macro-cell BS2 506. Such environments may include downtown city environments.

Wireless communication network 500 also includes a femto BS1 516 and a femto BS2 518. Femto BS1 516 links to paging controller 502 via a link 520. Femto BS2 518 links to paging controller 502 via a link 522. Links 520 and/or 522 may be any physical or logical link to paging controller 502, including via a network such as the Internet.

Femto BS1 516 and femto BS2 518 are located within macro coverage area 512 and provide overlapping coverage to macro coverage area 512. Femto BS1 516 and femto BS2 518 may be located to provide improved coverage of weak spots within macro coverage area 512. Specifically, femto BS1 516 provides wireless service over femto coverage area 524. Moreover, femto BS2 518 provides wireless service over femto coverage area 526.

For explanatory purposes, MS1 528 is a mobile station assumed to be located within macro coverage area 524, and outside femto coverage areas 524 and 526, and MS2 530 is a mobile station assumed to be within both macro coverage area 512 and femto coverage area 524.

Paging controller 502 includes a paging list 532 stored and maintained in a memory (not shown) within or otherwise accessible by paging controller 502. Paging list 532 includes a BS column 534 for both macro cell base stations and femto cell base stations, an MS column 536, and a paging group column 538. The use of paging list 532 is exemplary only, and is not intended to limit the scope of disclosed embodiments. Any configuration or data structure may be used to implement paging list 532. Moreover, additional information or less information may be included in paging list 532.

BS column 534 lists all base stations within wireless communication network 500. MS column 536 associates the base stations listed in BS column 534 with any number of mobile subscribers. For example, paging list 532 associates MS 1 528 and MS2 530 with both macro BS1 504 and macro BS2 506. Thus, if paging controller 502 seeks to page either MS1 528 and/or MS2 530, it may do so via macro BS1 504 and macro BS2 506 as recorded in paging list 532.

Paging group column 538 indicates that all base stations shown in FIG. 5 belong to the same paging group, with a paging group identifier of 0. As discussed, having a large number of base stations in the same paging group reduces the processing performed by an idle mobile subscriber upon moving between coverage areas. Specifically, if the idle mobile subscriber moves to a new coverage area with the same paging group as that of an old coverage area, the idle mobile subscriber should not need to perform a location update process. This, in turn, may conserve battery power in the idle mobile subscriber.

It is for this reason that macro BS1 504, macro BS2 506, femto BS1 516, and femto BS2 518 are assigned to the same paging group. Thus, MS1 528 and MS2 530 may move among macro coverage areas 512 and 514 and femto coverage areas 524 and 526 without performing the location update process. This should help to conserve battery power in MS1 528 and MS2 530.

However, as previously noted, a drawback of including a large number of base stations in the same paging group is an increase in overhead. This is because paging controller 502 would need to send a paging request to all base stations within the same paging group in order to locate an idle mobile subscriber. This is also because the macro cell base stations and femto-cell base stations would each send large periodic paging advertisements which include all idle mobile stations in the paging group. Thus, as the number of base stations in a paging group increases, the communications overhead associated with the number of paging requests and the number of idle MSs listed in the paging advertisements, also increases. For example, for paging controller 502 to locate MS2 530, it would need to page each of macro BS1 504, macro BS2, 506, femto BS1 516, and femto BS2 518. However, the use of paging list 532 can enable paging controller 502 to limit the number of paging requests sent to base stations. In the present example, paging list 532 associates MS2 530 with macro BS1 504 and macro BS2 506, and does not associate MS2 530 with femto BS1 516 and femto BS2 518. Thus, paging controller 502 can page MS2 530 via macro BS1 504 and macro BS2 506, without sending a paging request to femto BS1 516 and femto BS2 518. This is despite the fact that macro BS1 504, macro BS2 506, femto BS1 516, and femto BS2 518 are all in the same paging group.

Figure 6:
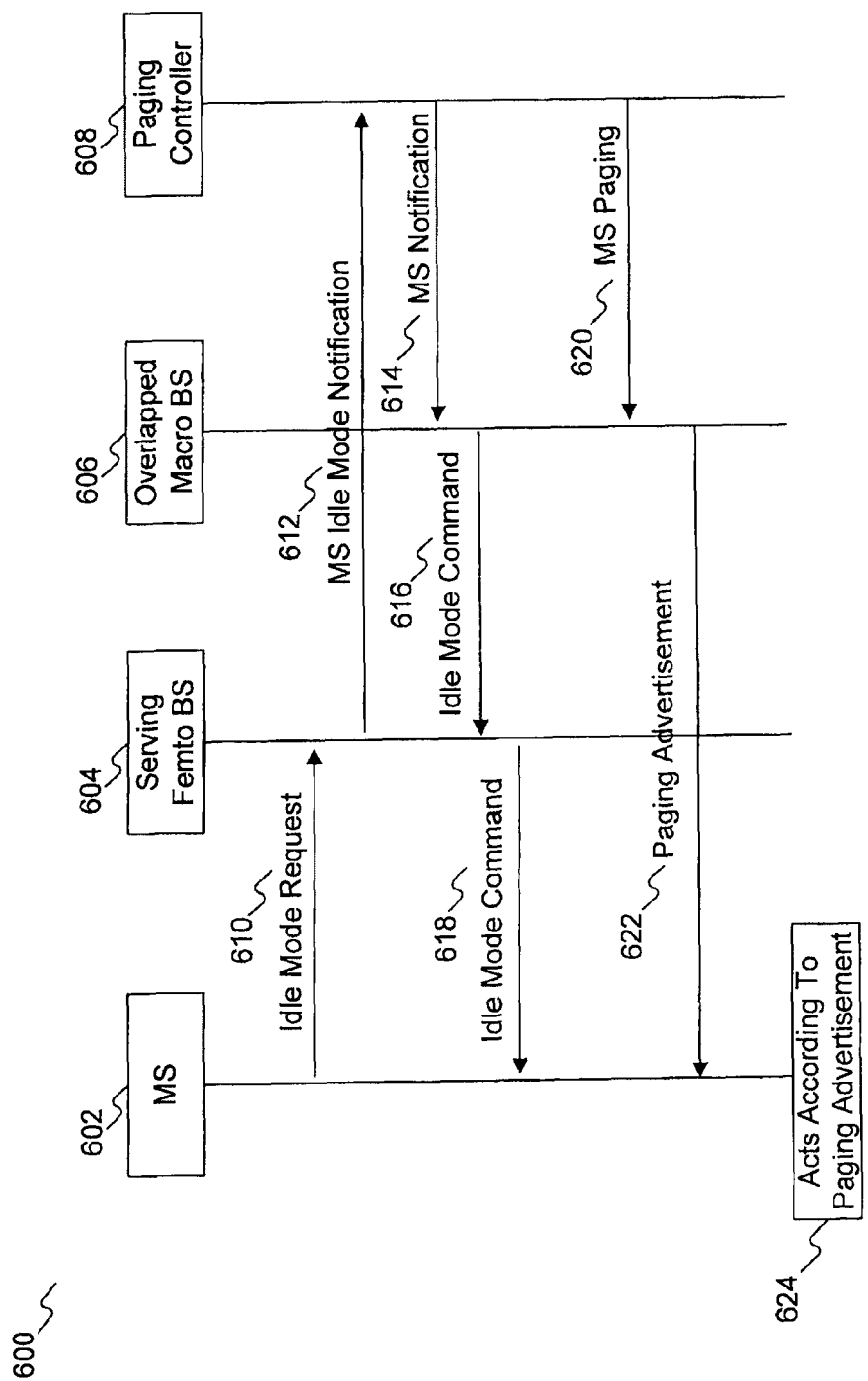
FIG. 6 is a flow diagram illustrating the second paging process for paging a mobile subscriber that is in idle mode.

FIG. 6 is a flow diagram illustrating a second paging process 600 for paging a mobile subscriber that is in idle mode. Paging process 600 reduces the communications overhead originating from a femtocell BS.

FIG. 6 illustrates communication among a mobile subscriber (MS) 602, a serving femto BS 604, an overlapped macro BS 606, and a paging controller 608. MS 602 is a mobile subscriber that seeks to enter into an idle mode to conserve battery power. MS 602 may be similar to MS2 530 in network 500. Overlapped macro BS 606 may represent one or more base stations belonging to a paging group.

MS 602 is assumed to be within a femto coverage area of serving femto BS 604. Serving femto BS 604 provides wireless service, such as voice and/or data, to MS 602. Serving femto BS 604 may be similar to femto BS1 516 in network 500. Serving femto BS 604 is within a macro coverage area of overlapped macro BS 606. Serving femto BS 604 strengthens a coverage of the macro coverage area of overlapped macro BS 606.

Overlapped macro BS 606 may be part of the same paging group as serving femto BS 604. Overlapped macro BS 606 represents all macro base stations that are part of the same paging group. For example, overlapped macro BS 606 may be similar to and/or may include both macro BS1 504 and macro BS2 506 of network 500.

Paging controller 608 is similar to paging controller 502 of network 500. Paging controller 608 seeks to locate MS 602 according to second paging process 600.

Second paging process 600 starts with MS 602. In particular, MS 602 sends an idle mode request 610 to serving femto BS 604. Idle mode request 610 is a request by MS 602 to enter into an idle mode. The idle mode should enable MS 602 to conserve battery power.

In response to request 610, serving femto BS 604 sends a mobile subscriber (MS) idle mode notification 612 to paging controller 608. MS idle mode notification 612 notifies paging controller 608 that MS 602 seeks to enter the idle mode.

Paging controller 608 then modifies the stored paging list. It is assumed that paging controller 608 modifies the paging list to indicate that MS 602 is associated with overlapped macro BS 606. Thus, paging controller 608 sends MS notification 614 to overlapped macro BS 606 after modifying the paging list. MS notification 614 assigns overlapped macro BS 606 the task of sending paging information about itself to MS 602. Therefore, overlapped macro BS 606 adds MS 602 and a corresponding action code, to the paging advertisement.

In response to MS notification 614, overlapped macro BS 606 sends an idle mode command 616 to serving femto BS 604. Idle mode command 616 includes the paging information about overlapped macro BS 606. The paging information in idle mode command 616 helps MS 602 listen to future paging advertisements from overlapped macro BS 606.

In response to idle mode command 616, serving femto BS 604 sends a forwarded idle mode command 618 to MS 602. Idle mode commands 616 and/or 618 prompt MS 602 to enter into the idle mode. Moreover, idle mode commands 616 and/or 618 may prompt MS 602 to disconnect from serving femto BS 604 and listen to paging advertisements from a base station with a larger coverage area, such as overlapped macro BS 606. This reduces communications overhead, because only overlapped macro BS 606 needs to send periodic paging advertisements to MS 602, while serving femto BS 604 does not.

At a later time, paging controller 608 seeks to page MS 602. Paging controller 608 checks the paging list to determine with which paging group MS 602 is associated. Paging controller 608 may also consult the paging list to find out to which base station it should send a paging request. Specifically, paging controller 608 accesses the paging list (which may be similar to paging list 532 of network 500) to determine that MS 602 is associated with overlapped macro BS 606. As a result, paging controller 608 sends an MS paging 620 to overlapped macro BS 606.

Overlapped macro BS 606 then updates the action code corresponding to MS 620 in the paging advertisement, without involving serving femto BS 604. This is because MS 602 disconnected from serving femto BS 604 when MS 602 entered the idle mode, and started listening for paging advertisements from overlapped macro BS 606. Paging advertisement 622 is periodically broadcast to all idle mobile subscribers within the macro coverage range. Paging advertisement 622 lists several idle mobile stations, including idle MS 602 and a corresponding action code that indicates that paging controller 608 seeks to page MS 602. After MS 602 receives paging advertisement 622, MS 602 responds to paging advertisement 622 according to the nature of paging advertisement 622. For example, if paging advertisement 622 prompts MS 602 to wake up from the idle mode, MS 602 may seek network re-entry after receiving paging advertisement 622. Specifically, MS 602 may seek to exit the idle mode, and establish a connection with overlapped macro BS 606.

Thus, second paging process 600 permits multiple base stations to belong to the same paging group, while reducing communications overhead. Specifically, second paging process 600 eliminates any paging advertisements between MS 602 and serving femto BS 604. Instead, the paging advertisements in second paging process 600 are solely between overlapped macro BS 606 and MS 602. Thus, second paging process 600 reduces communications overhead originating from serving femtocell BS 604.

Figure 7:
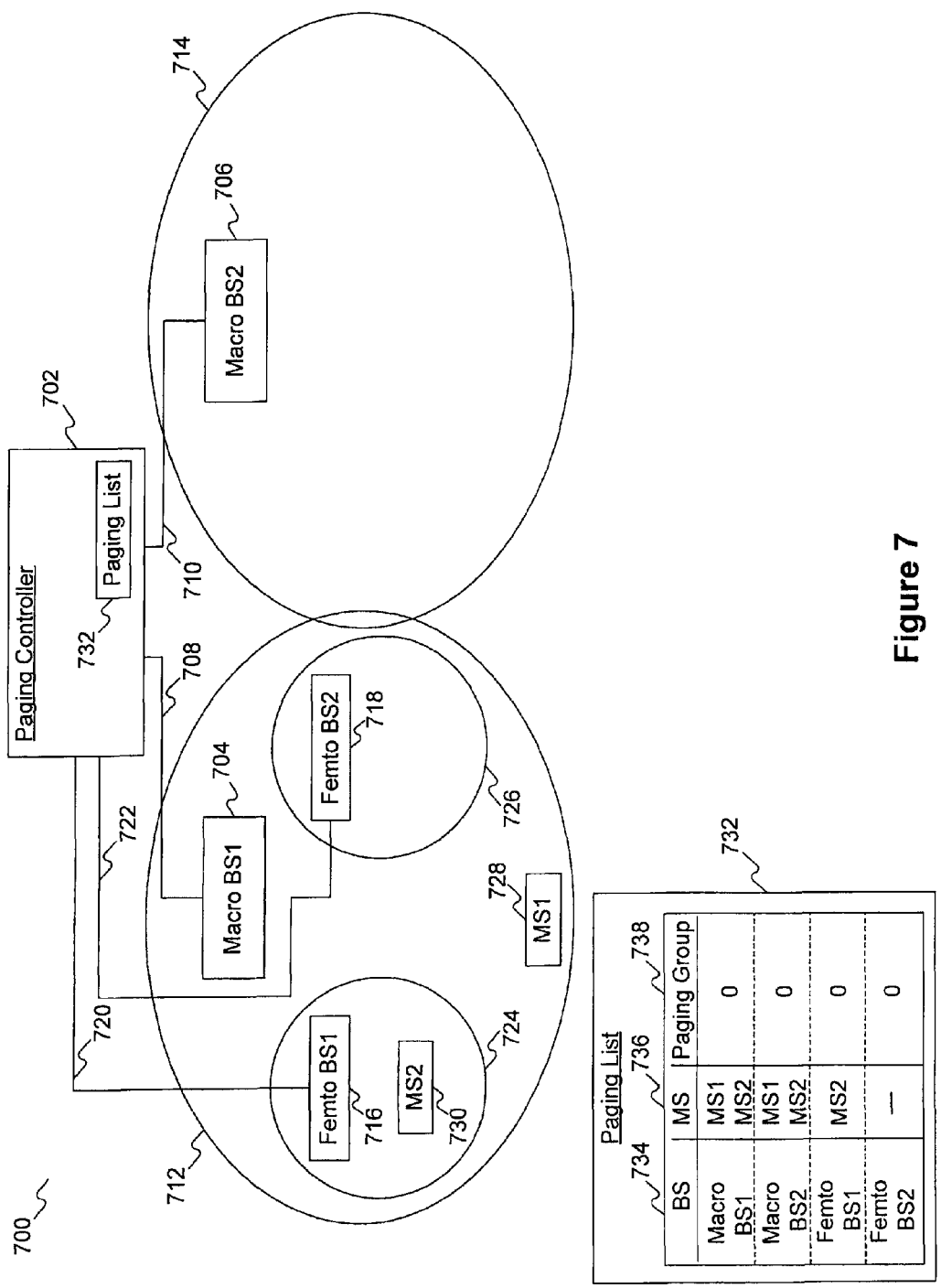
FIG. 7 is a diagram illustrating a wireless communication network used to provide third and fourth paging processes for a mobile subscriber involving femto-cells.

FIG. 7 is a diagram illustrating an exemplary wireless communication network 700, including femto-cells, in which third and fourth paging processes can be practiced for locating a mobile subscriber. Wireless communication network 700 may be the same as wireless communication network 500 from FIG. 5. However, wireless communication network 700 includes a paging list 732, which may be different from paging list 532.

Paging list 732 includes a BS column 734 for both macro cell base stations and femto cell base stations, an MS column 736, and a paging group column 738. The use of paging list 732 is exemplary only, and is not intended to limit the scope of disclosed embodiments. Any configuration or data structure may be used to implement paging list 732. Moreover, additional information or less information may be included in paging list 732.

BS column 734 lists all base stations within wireless communication network 700. MS column 736 associates the base stations listed in BS column 734 with any number of mobile subscribers. For example, paging list 732 associates MS1 728 and MS2 730 with both macro BS1 704 and macro BS2 706. Moreover, paging list 732 differs from paging list 532 in that it also associates MS2 730 with femto BS1 716. Thus, if paging controller 702 seeks to page MS2 730, it may do so via macro BS1 704, macro BS2 706, and/or femto BS1 716 as recorded in paging list 732.

Paging group column 738 indicates that all base stations shown in FIG. 7 belong to the same paging group, with a paging identifier of 0. As discussed, having a large number of base stations in the same paging group reduces the processing performed by an idle mobile subscriber upon moving between coverage areas. Specifically, if the idle mobile subscriber moves to a new coverage area that belongs to the same paging group as the immediately previous coverage area, the idle mobile subscriber should not need to perform a location update process. This, in turn, should conserve battery power in the idle mobile subscriber.

It is for this reason that macro BS1 704, macro BS2 706, femto BS1 716, and femto BS2 718 are part of the same paging group. Thus, MS1 728 and MS2 730 can move among macro coverage areas 712 and 714 and femto coverage areas 724 and 726 without performing the location update process. This should conserve battery power in MS1 728 and MS2 730.

However, as previously noted, a drawback of including femto-cell base stations in the same paging group is an increase in communications overhead. For example, if paging controller 702 seeks to locate MS1 728, it needs to send a paging request to each of macro BS1 704, macro BS2, 706, femto BS1 716, and femto BS2 718, which are part of the same paging group, (i.e., paging group 0). Macro BS1 704, macro BS2 706, femto BS1 716, and femto BS2 718 then broadcast paging advertisements to MS1 728 and MS2 730, which are both in the idle state. Moreover, each broadcasted paging advertisement includes an action code associated with MS1 728 and an action code associated with MS2 730, according to the paging request from paging controller 702. If femtocell BS1 716 is a closed subscriber group (CSG) femtocell as discussed above, then MS1 728 can not access femtocell BS1 716. In that case, it would be wasteful for femtocell BS1 716 to broadcast the MS1 704 and its corresponding action code in the paging advertisement, because MS1 728 can not access femtocell BS1. In this case, a paging advertisement from femtocell BS1 contains unnecessary information, e.g., MS1 728 and its corresponding action code, and causes communications overhead.

As another example, in order for paging controller 702 to locate MS2 730, it needs to send a paging request to each of macro BS1 704, macro BS2, 706, femto BS1 716, and femto BS2 718, which are part of the same paging group. However, the use of paging list 732 enables paging controller to limit the number of paging requests sent to base stations. For example, paging list 732 associates MS2 730 with femto BS1 716. Thus, paging controller 702 can page MS2 730 via femto BS1 716 only. This is despite the fact that macro BS1 704, macro BS2 706, femto BS1 716, and femto BS2 718 are all in the same paging group.

Figure 8:
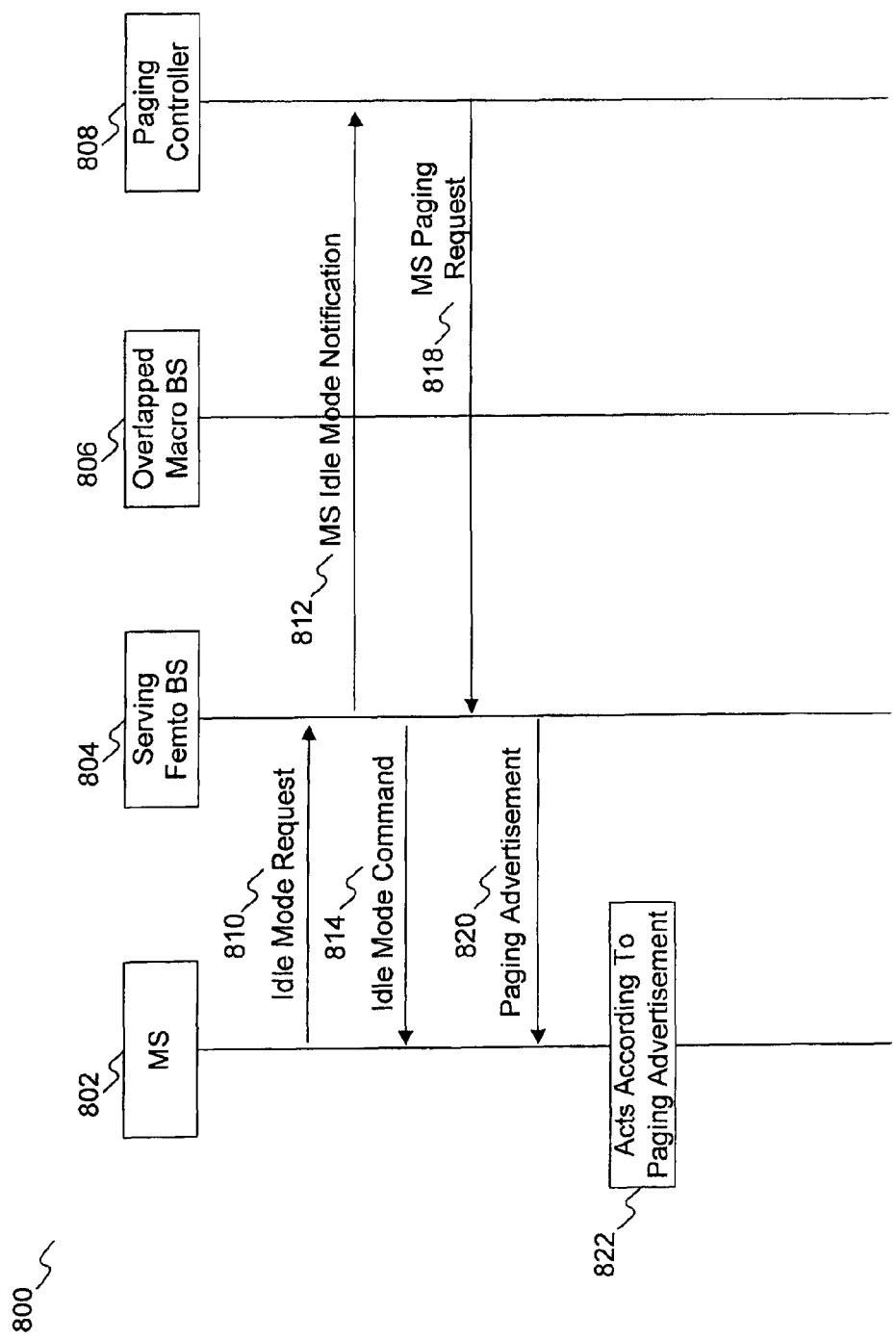
FIG. 8 is a flow diagram illustrating the third paging process for paging a stationary mobile subscriber that is in idle mode.

FIG. 8 is a flow diagram illustrating paging process 800 corresponding to the third paging process for paging a mobile subscriber that is in idle mode. Paging process 800 reduces communications overhead associated with a femto BS.

FIG. 8 illustrates communication among a mobile subscriber (MS) 802, a serving femto BS 804, an overlapped macro BS 806, and a paging controller 808, which may be similar to MS 602, serving femto BS 604, overlapped macro BS 606, and paging controller 608 from FIG. 6. Overlapped macro BS 806 may represent one or more base stations belonging to a paging group. For explanatory purposes, paging controller 808 may seek to locate MS 802 according to third paging process 800.

Third paging process 800 starts with MS 802 sending an idle mode request 810 to serving femto BS 804. Idle mode request 810 is a request by MS 802 to enter into an idle mode, which enables MS 802 to conserve battery power.

Serving femto BS 804 sends a mobile subscriber (MS) idle mode notification 812 to paging controller 808. MS idle mode notification 812 notifies paging controller 808 that MS 802 seeks to enter the idle mode. Paging controller 808 then updates a stored paging list to add MS 802 into the paging list and associate it with serving femto BS 804.

Serving femto BS 804 sends an idle mode command 814 to MS 802. Serving femto BS 804 also adds MS 802 and a corresponding action code to a paging advertisement periodically broadcasted by serving femto BS 804. Idle mode command 814 prompts MS 802 to enter into the idle mode. Moreover, idle mode command 814 prompts MS 802 to listen to paging advertisements from serving femto BS 804.

At a later time, paging controller 808 seeks to page MS 802. Paging controller 808 checks the paging list to determine with which paging group MS 802 is associated. Paging controller 808 also checks the paging list to determine to which base station it should send a paging request. Specifically, paging controller 808 accesses the paging list (which may be similar to paging list 732 from FIG. 7) to determine that MS 802 is associated with serving femto BS 804. Thus, paging controller 808 sends a MS paging request 818 to serving femto BS 804, instead of overlapped macro BS 806. After receiving MS paging request 818 from paging controller 808, serving femto BS 804 updates the action code corresponding to MS 802, based on MS paging request 818.

Serving femto BS 804 broadcasts paging advertisement 820, which lists MS 802 and its corresponding action code. Paging advertisement 820 is broadcasted by serving femto BS 804 to all idle mobile subscribers within the coverage range of serving femto BS 804. MS 802 receives paging advertisement 820, and reads its action code indicating that paging controller 808 seeks to page it. Next, MS 802 responds at block 822 according to the paging advertisement. In particular, paging controller 808 will page MS 802 for a reason. For example, paging controller 808 may want to connect to MS 802 or to locate MS 802. Thus, MS 802 responds with an action in accordance with the reason. In other words, paging controller 808 uses the paging advertisement 820 to inform MS 802 what actions to take. Thus, MS 802 acts in accordance with those actions.

Figure 9:
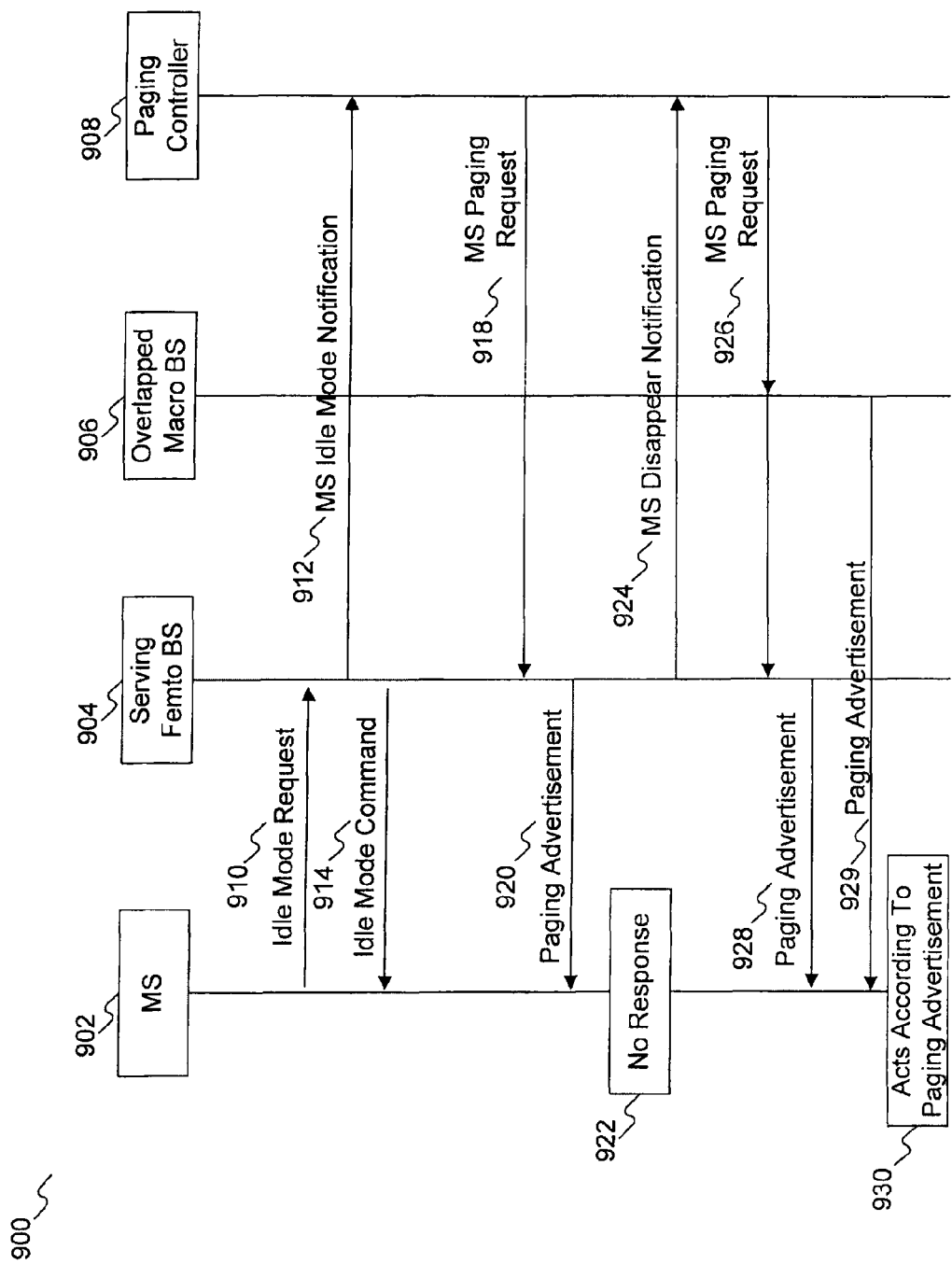
FIG. 9 is a flow diagram illustrating the third paging process for paging a mobile subscriber that is moving in idle mode.

FIG. 9 is a flow diagram illustrating a paging process 900 corresponding to the third paging process for paging a mobile subscriber. Paging process 900 differs from paging process 800 in that in paging process 900, the mobile subscriber does not receiving a paging advertisement while in idle mode. This may happen, for example, when the mobile station moves out of a coverage area of a base station that sends the paging advertisement. Items 902-920 generally correspond to items 802-820 in FIG. 8.

After sending a paging advertisement 920, a serving femto BS 904 waits for a predetermined period of time. Block 922 indicates that serving femto BS 904 does not receive a response to paging advertisement 920 after the predetermined period of time elapses. As a result, serving femto BS 904 sends an MS disappear notification 924 to a paging controller 908 after the predetermined period of time elapses. MS disappear notification 924 notifies paging controller 908 that serving femto BS 904 did not receive a response from MS 902. Upon receiving MS disappear notification 924, paging controller 908 updates its paging list. Paging controller 908 associates MS 902 with an overlapped macro BS 906 based on the likelihood that if MS 902 moves out of range of serving femto BS 904, it most likely moved within a range of overlapped macro BS 906, which has a larger overlapping range than serving femto BS 904. Paging controller 908 does not disassociate MS 902 from serving femto BS 904. Thus, the paging list of paging controller 908 associates MS 902 with both serving femto BS 904 and overlapped macro BS 906. This is because the reason for no response at block 922 may be due to transmission error or due to MS 902 moving outside the range of serving femto BS 904. If no response at block 922 was due to transmission error, then the paging list in paging controller 908 still needs to associate MS 902 with serving femto BS 904, since MS 902 has not moved outside the range of serving femto BS 904.

If MS 902 moves out of range of serving femto BS 904 and moves within a range of overlapped macro BS 906, MS 902 will synchronize with overlapped macro BS 906 and listen to the broadcast message of overlapped macro BS 906. This broadcast message contains paging information from overlapped macro BS 906. MS 902 then uses this paging information to listen to a paging advertisement sent from overlapped macro BS 906.

Next, paging controller 908 checks the paging list and determines that MS 902 is associated with serving femto BS 904 and overlapped macro BS 906. As a result, paging controller 908 sends an MS paging request 926 to serving femto BS 904 and overlapped macro BS 906. MS paging request 926 sent to overlapped macro BS 906 directs overlapped macro BS 906 to add MS 902 and its corresponding action code into the paging advertisement message. The serving femto BS 904 broadcasts paging advertisement 928 and overlapped macro BS 906 broadcasts paging advertisement 929 at each periodic interval. MS 902 may receive paging advertisements 928 and/or 929 from serving femto BS 904 and/or overlapped macro BS 906, and responds in accordance with paging advertisements 928 and/or 929 at block 930. For example, if the paging advertisement 928 requires MS 902 to wake up from the idle mode and seek network re-entry, MS 902 may send connection information to overlapped macro BS 906 in order to establish a connection to MS 902.

Third paging processes 800 and 900 permit multiple base stations to belong to the same paging group. Moreover, third paging processes 800 and 900 are compatible with legacy systems. Specifically, third paging processes 800 and 900 permit paging messages between serving femto BS 904 and MS 902 (unless MS902 moves out of range from serving femto BS 904). This increases overhead originating from serving femto BS 904. However, because MS 902 does not need to communicate directly with overlapped macro BS 906, MS 902 need not be modified in any way, and can maintain its legacy programming.

Figure 10:
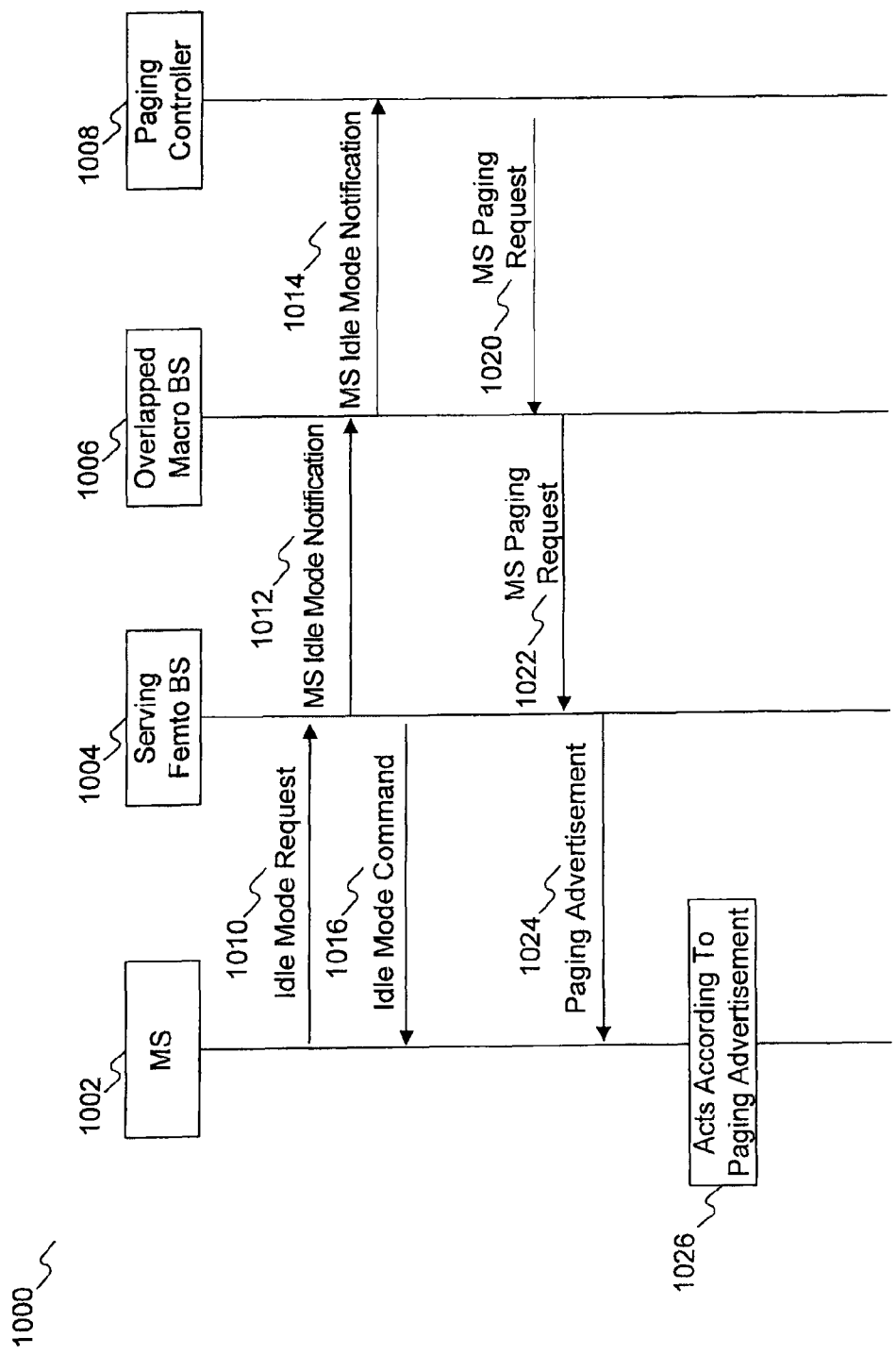
FIG. 10 is a flow diagram illustrating the fourth paging process for paging a stationary mobile subscriber that is in idle mode.

FIG. 10 is a flow diagram illustrating a paging process 1000 corresponding to the fourth paging process for paging a stationary mobile subscriber that is in idle mode.

FIG. 10 illustrates communication among a mobile subscriber (MS) 1002, a serving femto BS 1004, an overlapped macro BS 1006, and a paging controller 1008. Overlapped macro BS 1006 may represent one or more base stations belonging to a paging group. For explanatory purposes, paging controller 1008 seeks to locate MS 1002 according to paging process 1000.

Paging process 1000 starts with MS 1002 sending an idle mode request 1010 to serving femto BS 1004. Idle mode request 1010 is a request by MS 1002 to enter into an idle mode, which enables MS 1002 to conserve battery power.

Serving femto BS 1004 sends a mobile subscriber (MS) idle mode notification 1012 to overlapped macro BS 1006. After overlapped macro BS 1006 receives the MS idle mode notification 1012 from serving femto BS 1004, overlapped macro BS 1006 then creates or modifies a paging list which indicates that MS 1002 is mapped with serving femto BS 1004. Overlapped macro BS 1006 also sends a forwarded MS idle mode notification 1014 to paging controller 1008. MS idle mode notification 1014 notifies paging controller 1008 that MS 1002 seeks to enter the idle mode, and that paging controller 1008 needs to page MS 1002 in order to locate MS 1002. Paging controller 1008 then updates a stored paging list to indicate that MS 1002 is associated with overlapped macro BS 1006. Thus, unlike paging processes 800 and 900, in paging process 1000, a paging list of paging controller 1008 does not store information about femto cells, such as serving femto BS 1004. Instead, information about femto cells, e.g., serving femto BS 1004, is stored in the overlapping macro BS, e.g., overlapped macro BS 1006. With regards to networks with numerous femto cells, this practice decreases the size of the paging list stored in paging controller 1008.

At a later time, paging controller 1008 seeks to page MS 1002. Paging controller 1008 checks the paging list to determine with which paging group MS 1002 is associated. Paging controller 1008 also checks the paging list to determine to which base station it should send a paging request. Specifically, paging controller 1008 accesses the paging list (which may be similar to paging list 732 in FIG. 7) to determine that MS 1002 is associated with overlapped macro BS 1006. As a result, paging controller 1008 sends an MS paging request 1020 to overlapped macro BS 1006. After overlapped macro BS 1006 receives MS paging request 1020, overlapped macro BS 1006 checks its paging list to determine which femto cell base station should handle MS paging request 1020 for MS 1002. As a result, overlapped macro BS 1006 relays an MS paging request 1022 to serving femto BS 1004.

Serving femto BS 1004 broadcasts paging advertisement 1024, which lists MS 1002 and its corresponding action code, based on paging request 1022. Paging advertisement 1024 is broadcast to all idle mobile subscribers within the femto coverage range, searching for MS 1002. MS 1002 receives paging advertisement 1024, and responds at block 1026 according to the paging advertisement.

Figure 11:
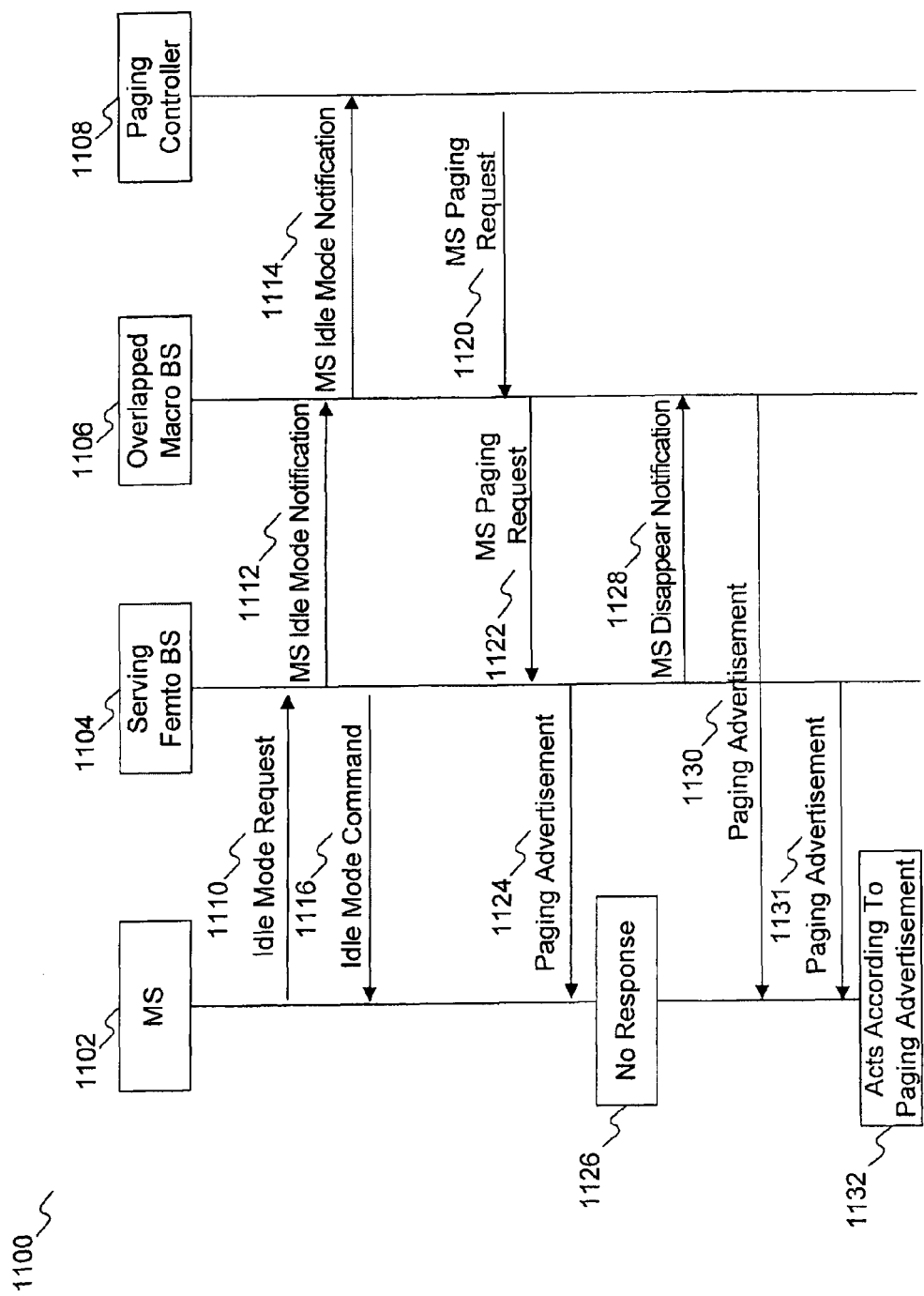
FIG. 11 is a flow diagram illustrating the fourth paging process for paging a mobile subscriber that is moving in idle mode.

FIG. 11 is a flow diagram illustrating a paging process 1100 corresponding to the fourth paging process for paging a mobile subscriber that does not receiving a paging advertisement, while in idle mode, after receiving idle mode command 1116 from serving femto BS 1104. Items 1102-1124 generally correspond to items 1002-1024 in FIG. 10. In particular, after MS1 102 does not receive paging advertisement 1124 from serving femto BS 1104. MS 1102 may still be in the coverage area of serving femto BS 1104, but may not receive paging advertisement 1124 because of a transmission error, or MS 1102 may move into the coverage area of overlapped macro BS 1106. If MS 1102 moves into the coverage area of overlapped macro BS 1106, then MS 1102 will disconnect from serving femto BS 1104 and synchronize with overlapped macro BS 1106 in order to listen to broadcast messages from overlapped macro BS 1106. Based on the paging information in the broadcast message, MS 1102 can listen to the paging advertisement from overlapped macro BS 1106. From the broadcast message, MS 1102 will find that the paging group ID does not change, since serving femto BS and overlapped macro BS support the same paging group, and does not perform the location update process. Since MS 1102 does not perform the location update process, serving femto BS 1104, overlapped macro BS 1106, and paging controller 1108 do not know that MS 1102 already moved out of the coverage area of serving femto BS 1104.

After sending a paging advertisement 1124, a serving femto BS 1104 waits for a predetermined period of time. Block 1126 indicates that serving femto BS 1104 does not receive a response to paging advertisement 1124 after the predetermined period of time elapses. As a result, serving femto BS 1104 sends an MS disappear notification 1128 to an overlapped macro BS 1106 after the predetermined period of time elapses. MS disappear notification 1128 notifies overlapped macro BS 1106 that serving femto BS 1104 did not receive a response from MS 1102.

Then, overlapped macro BS 1106 adds MS 1102 and its corresponding action code into the paging advertisement and sends a modified paging advertisement 1130 at a periodic interval. Serving femto BS 1104 also broadcasts a paging advertisement 1131 that contains MS 1102 and its corresponding action code at its periodic interval, because MS 1102 may be still in the coverage of serving femto BS 1104. MS 1102 can receive paging advertisement 1130 from serving femto BS 1104 and/or overlapped macro BS 1106, and act according to paging advertisement 1130 at block 1132. For example, if paging advertisement 1130 requires MS 1102 to wake up from the idle mode and seek network re-entry, the MS 1102 may send connection information to overlapped macro BS 1106 in order to establish a connection to idle MS 1102. Compared with the paging process 900, paging process 1100 allows paging controller 1108 to not perform any actions when serving femto BS 1104 did not receive a response from MS 1102. This is because paging controller 1108 does not receive MS disappear notification 1128, and, therefore, does not need to respond to it. In this way, paging process 1100 can reduce communications overhead from paging controller 1108.

Fourth paging processes 1000 and 1100 permit multiple base stations to belong to the same paging group. Moreover, fourth paging processes 1000 and 1100 are be compatible with legacy systems, as are third paging processes 800 and 900. Specifically, fourth paging processes 1000 and 1100 permit paging messages between serving femto BS 1104 and MS 1102 (unless MS 1102 moves out of range from serving femto BS 1104 or some kind of transmission error occurs). This increases overhead originating from serving femto BS 1104. However, because MS 1102 does not need to communicate directly with overlapped macro BS 1106, MS 1102 need not be modified in any way, and can maintain its legacy programming.

Moreover, fourth paging processes 1000 and 1100 allow for a smaller paging list stored (or accessible) by a paging controller 1108. For example, because fourth paging process 1100 allow overlapped macro BS 1106 to forward MS paging request 1120 (as MS paging request 1122) on behalf of paging controller 1108, paging controller 1108 need not store information about serving femto BS 1104. In other words, there is no communication between serving femto BS 1104 and paging controller 1108 in fourth paging processes 1000 and 1100. This is possible because overlapped macro BS 1106 serves as an intermediary between paging controller 1108 and serving femto BS 1104. Thus, when paging controller 1108 seeks to page MS 1102, it need only determine with which overlapped macro BS 1106 MS 1102 is affiliated. Overlapped macro BS 1106 may then determine the particular serving femto BS 1104. In this way, paging controller 1108 can reduce the size of its paging list.

Figure 12:
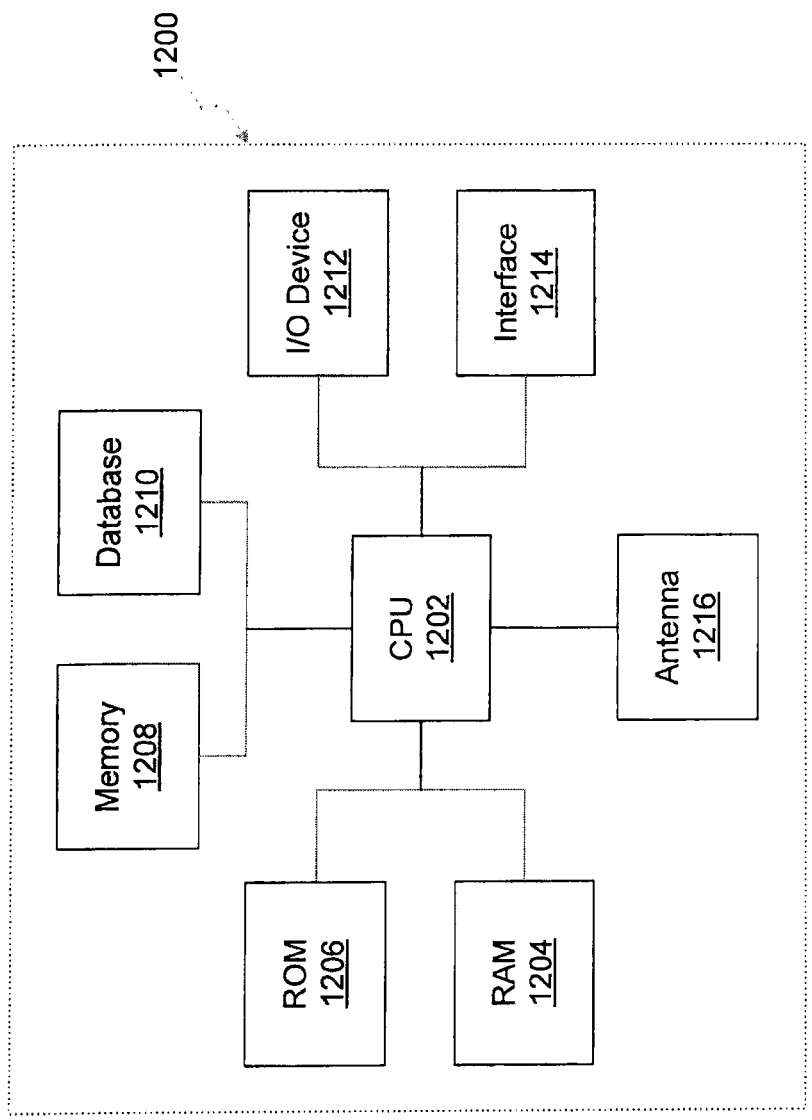
FIG. 12 is a diagram illustrating a host that may be used to implement paging controllers, macro cell base stations, femto cell base stations, and/or mobile subscribers.

With reference to FIG. 12, each component described herein, e.g., paging controllers, macro cell base stations, femto cell base stations, mobile subscribers, etc, may be implemented as a host 1200 including one or more of the following components: at least one central processing unit (CPU) 1202 configured to execute computer program instructions to perform various processes and methods, random access memory (RAM) 1204 and read only memory (ROM) 1206 configured to access and store information and computer program instructions, memory 1208 to store data and information, one or more databases 1210 to store tables, lists, or other data structures, one or more I/O devices 1212, one or more interfaces 1214, and one or more antennas 1216. Each of these components is well-known in the art.

Other embodiments of the application will be apparent to those skilled in the art from consideration of the specification and practice of the application disclosed herein. It is intended that the specification and examples be considered as exemplary only, with a true scope and spirit of the application being indicated by the following claims.

What is claimed is:

1. A method of paging one of a plurality of mobile subscribers in a wireless communication network, the method comprising:

receiving, at a first base station, an idle mode request from the one mobile subscriber, the first base station providing wireless coverage over a first geographical range;

sending, from the first base station, an idle mode notification to a paging controller, after receiving the idle mode request from the one mobile subscriber;

receiving a paging request at the first base station from the paging controller;

sending, from the first base station, a first paging advertisement intended for the one mobile subscriber after receiving the paging request from the paging controller;

determining, at the first base station, that a predetermined period of time has elapsed without receiving a response from the one mobile subscriber after sending the first paging advertisement;

sending, from the first base station, a disappear notification to the paging controller after the predetermined period of time has elapsed;

sending, by the paging controller, a second paging request to a second base station after receiving the disappear notification from the first base station; and sending, from the second base station, a second paging advertisement intended for the one mobile subscriber, the second base station providing wireless coverage over a second geographical range that is larger than the first geographical range, wherein the first base station and the second base station are assigned to a same paging group with a same paging group identifier.

2. The method of claim 1, the method further comprising:
receiving, at the second base station, a paging response from the one mobile subscriber.

3. The method of claim 1, further comprising:
providing the first base station as a femto-cell base station that provides wireless coverage over a first geographical range; and
providing the second base station as a macro-cell base station that provides wireless coverage over a second geographical range, wherein the second geographical range is larger than the first geographical range, and the first geographical range is overlapped by the second geographical range.

4. The method of claim 1, further comprising:
sending, by the second base station, the paging request to the first base station after receiving the paging request from the paging controller; and
receiving, by the second base station, the disappear notification from the first base station,
wherein the paging controller is different from the second base station.

5. The method of claim 1, further comprising:
sending, by the paging controller, the paging request to the first base station when the paging controller seeks to page the one mobile subscriber.

6. A non-transitory computer-readable medium comprising program instructions, which, when executed by a processor, cause the processor to perform a method of paging one of a plurality of mobile subscribers in a wireless communication network, the method comprising:
receiving, at a first base station, an idle mode request from the one mobile subscriber, the first base station providing wireless coverage over a first geographical range;
sending, from the first base station, an idle mode notification to a paging controller, after receiving the idle mode request from the one mobile subscriber;
receiving a paging request at the first base station from the paging controller;
sending, from the first base station, a first paging advertisement intended for the one mobile subscriber after receiving the paging request from the paging controller
determining, at the first base station, that a predetermined period of time has elapsed without receiving a response from the one mobile subscriber after sending the first paging advertisement;
sending, from the first base station, a disappear notification to the paging controller after the predetermined period of time has elapsed;
sending, by the paging controller, a second paging request to a second base station after receiving the disappear notification from the first base station; and
sending, from the second base station, a second paging advertisement intended for the one mobile subscriber, the second base station providing wireless coverage over a second geographical range that is larger than the first geographical range,
wherein the first base station and the second base station are assigned to a same paging group with a same paging group identifier.

7. The computer-readable medium of claim 6, the method further comprising:
receiving, at the second base station, a paging response from the one mobile subscriber.

8. The computer-readable medium of claim 6, the method further comprising:
providing the first base station as a femto-cell base station that provides wireless coverage over a first geographical range; and
providing the second base station as a macro-cell base station that provides wireless coverage over a second geographical range, wherein the second geographical range is larger than the first geographical range, and the first geographical range is overlapped by the second geographical range.

9. The computer-readable medium of claim 6, the method further comprising:
sending, by the second base station, the paging request to the first base station after receiving the paging request from the paging controller; and
receiving, by the second base station, the disappear notification from the first base station,
wherein the paging controller is different from the second base station.

10. The computer-readable medium of claim 6, the method further comprising sending, by the paging controller, the paging request to the first base station when the paging controller seeks to page the one mobile subscriber.

11. A system for paging one of a plurality of mobile subscribers in a wireless communication network, the system comprising:
a first base station, providing wireless coverage over a first geographical range, and configured to:
receive an idle mode request from the one mobile subscriber;
send an idle mode notification to a paging controller, after receiving the idle mode request from the one mobile subscriber;
receive a paging request from the paging controller;
send a first paging advertisement intended for the one mobile subscriber after receiving the paging request from the paging controller;
determine that a predetermined period of time has elapsed without receiving a response from the one mobile subscriber after sending the first paging advertisement; and
send a disappear notification to the paging controller after the predetermined period of time has elapsed; and
a second base station, which provides wireless coverage over a second geographical range that is larger than the first geographical range, and which is configured to:
receive a second paging request from the paging controller after the paging controller has received the disappear notification from the first base station; and
send a second paging advertisement intended for the one mobile subscriber,
wherein the first base station and the second base station are assigned to a same paging group with a same paging group identifier.

12. The system of claim 11, wherein the second base station is further configured to:
send the second paging advertisement intended for the one mobile subscriber; and
receive a paging response from the one mobile subscriber.

13. The system of claim 12, wherein:
the first base station is a femto-cell base station that provides wireless coverage over a first geographical range; and
the second base station is a macro-cell base station that provides wireless coverage over a second geographical range, wherein the second geographical range is larger than the first geographical range, and the first geographical range is overlapped by the second geographical range.

14. The system of claim 11, wherein the second base station is further configured to:
send the paging request to the first base station after receiving the paging request from the paging controller;
receive the disappear notification from the first base station; and
send the second paging advertisement for the one mobile subscriber, wherein the paging controller is different from the second base station.

15. The system of claim 11, wherein:
the paging controller is configured to send the paging request to the first base station when seeking to page the one mobile subscriber.

16. A method of paging an idle mobile subscriber in a wireless communication network, the method comprising:
receiving, at a first base station, an idle mode request from the mobile subscriber;
sending, from the first base station, an idle mode notification to a paging controller, after receiving the idle mode request from the mobile subscriber;
receiving, at the first base station, an idle mode command from a second base station; and
sending, from the first base station, the idle mode command to the mobile subscriber after receiving the idle mode command from the second base station, wherein the idle mode command prompts the mobile subscriber to disconnect from the first base station and to listen for a paging advertisement from the second base station;
wherein the first base station and the second base station are assigned to a same paging group with a same paging group identifier.

17. The method of claim 16, further comprising:
receiving, at the second base station, a paging request from the paging controller;
sending, from the second base station, the paging advertisement to the mobile subscriber, after receiving the paging request from the paging controller; and
receiving, at the second base station, a paging response from the mobile subscriber, after sending the paging advertisement.

18. The system of claim 16, wherein:
the first base station is a femto-cell base station that provides wireless coverage over a first geographical range;
the second base station is a macro-cell base station that provides wireless coverage over a second geographical range, wherein the first geographical range is overlapped by the second geographical range; and
the first base station and the second base station are part of a same paging group with a same paging group identifier.

19. A method of paging one of a plurality of mobile subscribers in a wireless communication network, the method comprising:
receiving, from a first base station, an idle mode notification at a paging controller;
sending, from the paging controller, a paging request to the first base station, the paging request instructing the first base station to send a first paging advertisement intended for the one mobile subscriber, the first base station providing wireless coverage over a first geographical range;
receiving, at the paging controller, a disappear notification from the first base station indicating that the first base station did not receive a response from the one mobile subscriber within a predetermined period of time; and
sending, from the paging controller, a second paging request to a second base station after receiving the disappear notification from the first base station, the second paging request causing the second base station to send a second paging advertisement intended for the one mobile subscriber, the second base station providing wireless coverage over a second geographical range that is larger than the first geographical range;
wherein the first base station and the second base station are assigned to a same paging group with a same paging group identifier.

* * * * *